(12) United States Patent
Lee

(10) Patent No.: US 11,281,332 B2
(45) Date of Patent: Mar. 22, 2022

(54) TOUCH DISPLAY DEVICE, TOUCH DRIVING CIRCUIT, AND TOUCH SENSING METHOD

(71) Applicant: LG Display Co., Ltd., Seoul (KR)

(72) Inventor: HongJu Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/122,162

(22) Filed: Dec. 15, 2020

(65) Prior Publication Data

US 2021/0200375 A1 Jul. 1, 2021

(30) Foreign Application Priority Data

Dec. 27, 2019 (KR) .................. 10-2019-0177011

(51) Int. Cl.
*G06F 3/041* (2006.01)
(52) U.S. Cl.
CPC ................................ *G06F 3/0418* (2013.01)

(58) Field of Classification Search
CPC .. G06F 3/0418; G06F 3/04182; G06F 3/0443; G06F 3/04166; G06F 3/0412; G09G 3/32
See application file for complete search history.

(56) References Cited

U.S. PATENT DOCUMENTS

| 2017/0123551 A1* | 5/2017  | Li   | G06F 3/047   |
|------------------|---------|------|--------------|
| 2018/0307337 A1* | 10/2018 | Ahn  | G06F 3/041   |
| 2019/0079631 A1* | 3/2019  | Kim  | G06F 3/0416  |
| 2019/0171320 A1* | 6/2019  | Kim  | G06F 3/0416  |
| 2019/0384452 A1* | 12/2019 | Kang | G06F 3/04184 |
| 2019/0385551 A1* | 12/2019 | Kim  | G06F 3/04184 |

* cited by examiner

*Primary Examiner* — Md Saiful A Siddiqui
(74) *Attorney, Agent, or Firm* — Fenwick & West LLP

(57) ABSTRACT

Embodiments of the present disclosure relate to a touch display device, a touch driving circuit, and a touch sensing method, and enable differential sensing using a single-ended amplifier without using a differential amplifier, thereby not only accurately sensing a touch during display driving, but also significantly reducing the number of circuit components and the circuit area for differential sensing.

19 Claims, 17 Drawing Sheets

TOUCH DISPLAY DEVICE, TOUCH DRIVING CIRCUIT, AND TOUCH SENSING METHOD

CROSS REFERENCE TO RELATED APPLICATION

This application claims priority from Republic of Korea Patent Application No. 10-2019-0177011, filed on Dec. 27, 2019, which is hereby incorporated by reference in its entirety.

BACKGROUND

1. Field of Technology

Embodiments of the present disclosure relate to a touch display device, a touch driving circuit, and a touch sensing method.

2. Description of the Related Art

With the development of information society, the demand for display devices for displaying images is increasing in various forms. Among these display devices, there is a touch display device that provides a touch-based input method that allows a user to input information or commands intuitively and conveniently by moving away from a conventional input method such as a button, a keyboard, and a mouse.

Since such a touch display device needs to provide both an image display function and a touch detection function, a driving time such as a frame time is divided into a display driving period and a touch driving period. Display driving is performed in the display driving period, and touch driving and touch sensing are performed in the touch driving period that is performed after the display driving period.

In the case of the time-division driving method described above, in order to time-divide to proceed the display driving and the touch driving within a preset time, a fairly sophisticated timing control may be required and, for this, an expensive component may be required.

In addition, in the case of the time-division driving method, both the display driving time and the touch driving time may be insufficient, and thus both the image quality and the touch sensitivity are deteriorated. In particular, due to the application of the touch sensing function, it is more difficult to provide high-resolution image quality.

Due to the limitation of the time division driving method, when the display driving and the touch driving are simultaneously performed, the touch driving is affected by the display driving, so that touch sensing is not possible at all or the sensing accuracy may be significantly reduced. In addition, the display driving is affected by the touch driving, which may cause a problem that the image quality is significantly deteriorated.

SUMMARY

Embodiments of the present disclosure may provide a touch display device, a touch driving circuit, and a touch sensing method capable of providing a normal image and a normal touch sensing while simultaneously performing display driving and touch driving.

In addition, embodiments of the present disclosure may provide a touch display device, a touch driving circuit, and a touch sensing method capable of accurately sensing a touch without an influence of display driving through differential sensing, when the display driving and the touch driving are simultaneously performed.

In addition, embodiments of the present disclosure may provide a touch display device, a touch driving circuit, and a touch sensing method capable of accurately sensing a touch without an influence of display driving by performing a differential sensing, and furthermore, of significantly reducing the number of circuit components for differential sensing and the circuit area, when the display driving and the touch driving are simultaneously performed.

Embodiments of the present disclosure may provide a touch display device including a display panel in which a plurality of data lines and a plurality of gate lines are disposed, and in which a plurality of touch electrodes are disposed; a data driving circuit configured to drive the plurality of data lines; a gate driving circuit configured to drive the plurality of gate lines; and a touch driving circuit configured to differentially sense a first touch electrode and a second touch electrode among the plurality of touch electrodes.

In a touch display device according to embodiments of the present disclosure, the touch driving circuit may include a first current conveyor including a first touch node terminal which receives a first input charge from the first touch electrode, and a first outflow terminal through which a first transfer charge corresponding to the first input charge flows out; and a second current conveyor including a second touch node terminal which receives a second input charge from the second touch electrode, and a second inflow terminal through which a second transfer charge corresponding to the second input charge flows in.

In a touch display device according to embodiments of the present disclosure, the touch driving circuit may include a single-ended amplifier including a sensing input terminal to which the first outflow terminal and the second inflow terminal are electrically connected in common, and to which a differential charge between the first transfer charge and the second transfer charge is input, a reference input terminal to which a reference voltage is applied, and an amplification output terminal that outputs a differential output signal corresponding to the differential charge.

In a touch display device according to embodiments of the present disclosure, the first transfer charge is determined according to the first input charge and a first output gain of the first current conveyor, and the second transfer charge is determined according to the second input charge and a second output gain of the second current conveyor.

In a touch display device according to embodiments of the present disclosure, in the first transfer charge flowing out through the first outflow terminal selected as a first output node terminal of the first current conveyor, a charge is reduced as much as the second transfer charge flowing into the second inflow terminal selected as a second output node terminal of the second current conveyor. The differential charge is a charge that is reduced as much as the second transfer charge from the first transfer charge, and is a charge that removed (canceled out) a noise charge that is commonly included in the first transfer charge and the second transfer charge.

In a touch display device according to embodiments of the present disclosure, the first current conveyor includes a first driving terminal to which a driving signal is input, and the second current conveyor includes a second driving terminal to which the driving signal is input.

In a touch display device according to embodiments of the present disclosure, in the first current conveyor, the first transfer charge corresponding to the first outflow current flows out through the first outflow terminal selected as a first output node terminal among the first outflow terminal and the first inflow terminal. In the second current conveyor, the second transfer charge corresponding to the second inflow current flows into the second inflow terminal selected as a second output node terminal among the second inflow terminal and the second outflow terminal.

In a touch display device according to embodiments of the present disclosure, the touch driving circuit may supply the driving signal having a selected signal waveform among a signal waveform whose voltage level fluctuates depending on a type of a touch object to be sensed and a signal waveform whose voltage level is constant.

In a touch display device according to embodiments of the present disclosure, the reference voltage has a signal waveform whose voltage level fluctuates or a signal waveform whose voltage level is constant.

In a touch display device according to embodiments of the present disclosure, the plurality of touch electrodes are disposed in a matrix form, and an area occupied by each of the plurality of touch electrodes overlaps an area occupied by two or more sub-pixels.

In a touch display device according to embodiments of the present disclosure, the first touch electrode and the second touch electrode may be disposed in the same column or row.

In a touch display device according to embodiments of the present disclosure, two or more data lines overlapping the first touch electrode and two or more data lines overlapping the second touch electrode are the same, and two or more gate lines overlapping the first touch electrode and two or more gate lines overlapping the second touch electrode may be different from each other.

In a touch display device according to embodiments of the present disclosure, a plurality of touch lines electrically connecting the plurality of touch electrodes and the touch driving circuit are disposed in the display panel, and the plurality of touch lines are disposed parallel to the plurality of data lines.

In a touch display device according to embodiments of the present disclosure, a touch driving circuit applies a driving signal to the first touch electrode and the second touch electrode, while display driving is performed by supplying a data signal for displaying an image to the plurality of data lines.

Embodiments of the present disclosure may provide a touch driving circuit comprising a first current conveyor, a second current conveyor, and a single-ended amplifier.

In the touch driving circuit according to embodiments of the present disclosure, the first current conveyor may include a first touch node terminal which receives a first input charge from a first touch electrode among a plurality of touch electrodes disposed in a display panel, and a first outflow terminal through which a first transfer charge corresponding to the first input charge flows out.

In a touch driving circuit according to embodiments of the present disclosure, the second current conveyor may include a second touch node terminal which receives a second input charge from a second touch electrode among the plurality of touch electrodes, and a second inflow terminal through which a second transfer charge corresponding to the second input charge flows in.

In a touch driving circuit according to embodiments of the present disclosure, the single-ended amplifier may include a sensing input terminal to which the first outflow terminal and the second inflow terminal are electrically connected in common, and to which a differential charge between the first transfer charge and the second transfer charge is input, a reference input terminal to which a reference voltage is applied, and an amplification output terminal that outputs a differential output signal corresponding to the differential charge.

The differential charge is a charge from which a noise charge that is commonly included in the first transfer charge and the second transfer charge is removed.

Embodiments of the present disclosure may provide a method of sensing a touch including: outputting a data signal and a gate signal to a data line and a gate line disposed in a display panel, and applying a driving signal to a first touch electrode and a second touch electrode among a plurality of touch electrodes disposed in the display panel; and sensing a touch by differentially sensing the first touch electrode and the second touch electrode, while displaying an image in response to the data signal and the driving signal.

Sensing a touch includes controlling a flow of a first input charge input from the first touch electrode and a flow of a second input charge input from the second touch electrode to be in opposite directions, and generating a differential sensing value by removing a noise charge based on the first input charge and the second input charge whose flow direction is controlled.

According to embodiments of the present disclosure, normal image and normal touch sensing may be provided, while simultaneously performing a display driving and a touch driving.

In addition, according to embodiments of the present disclosure, when the display driving and the touch driving are simultaneously performed, the touch can be accurately sensed without the influence of the display driving through differential sensing.

In addition, according to embodiments of the present disclosure, when the display driving and the touch driving are simultaneously performed, differential sensing may be performed to accurately sense the touch without the influence of the display driving, and furthermore, the number of circuit components and the circuit area for differential sensing can be significantly reduced, by enabling differential sensing using a single-ended amplifier rather than using a differential amplifier.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
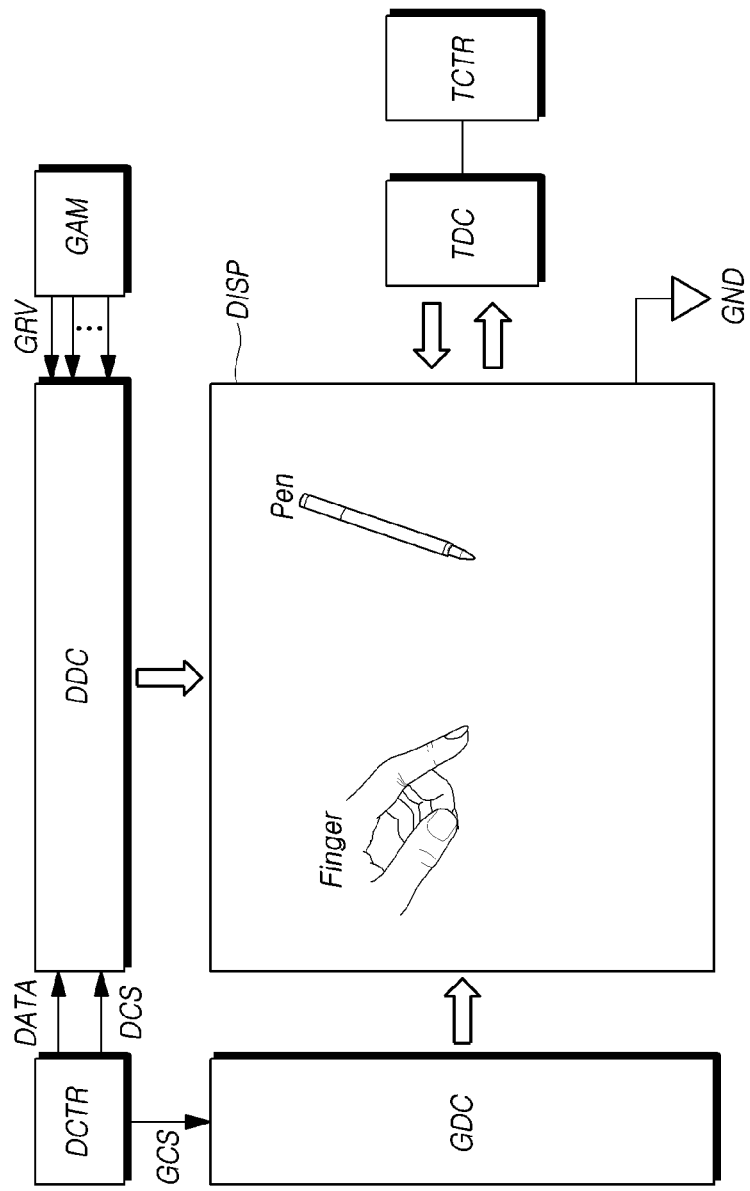
FIG. 1 is a system configuration diagram of a touch display device according to embodiments of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(a)", or "(b)" may be used herein to describe elements of the present disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Hereinafter, embodiments of the present disclosure will be described in detail with reference to the accompanying drawings.

Figure 2:
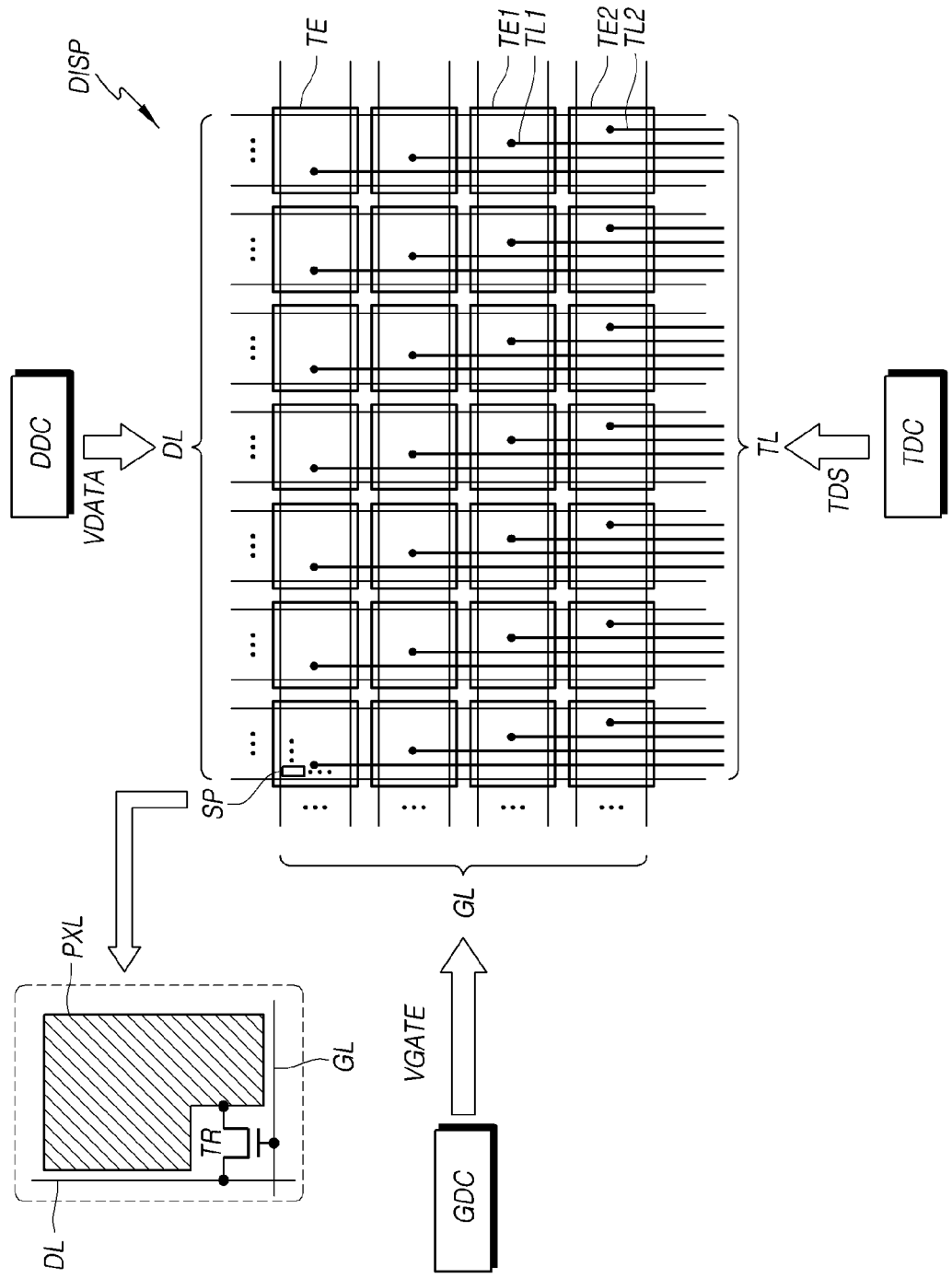
FIG. 2 is a diagram illustrating a display panel and driving circuits according to embodiments of the present disclosure.
Figure 3:
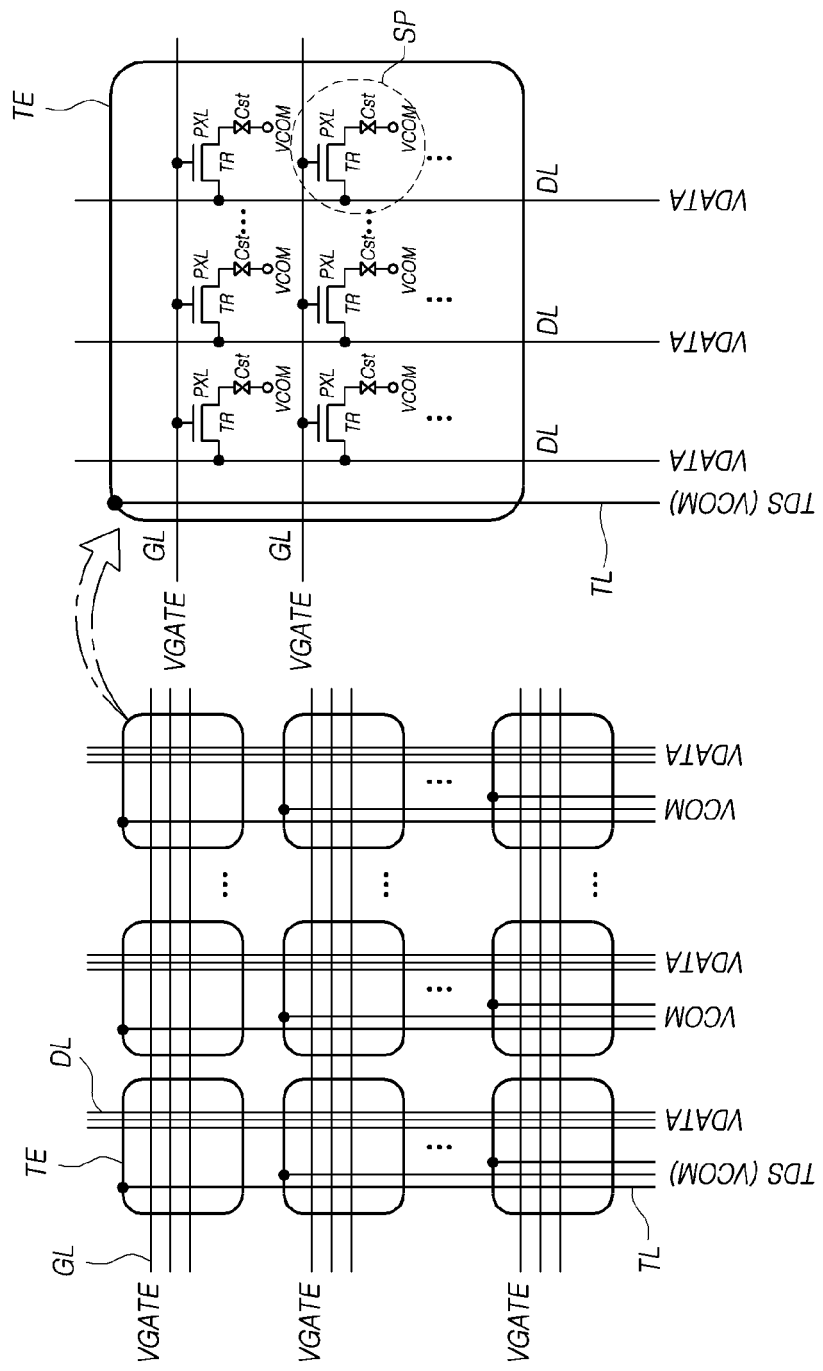
FIG. 3 is a diagram illustrating an arrangement structure of sub-pixels in one touch electrode area in a display panel according to embodiments of the present disclosure.

FIG. 1 is a system configuration diagram of a touch display device according to embodiments of the present disclosure, FIG. 2 is a diagram illustrating a display panel DISP and driving circuits according to embodiments of the present disclosure, and FIG. 3 is a diagram illustrating an arrangement structure of sub-pixels SPs in one touch electrode TE area in a display panel DISP according to embodiments of the present disclosure.

Referring to FIG. 1, a touch display device according to embodiments of the present disclosure may provide a display function for displaying an image. In addition, the touch display device according to embodiments of the present disclosure may provide a touch sensing function for sensing a user's touch and a touch input function for performing input processing according to user's touch using the touch sensing result.

Referring to FIGS. 1 to 3, the touch display device according to embodiments of the present disclosure may include a display panel DISP in which a plurality of data lines DL and a plurality of gate lines GL are disposed in order to provide a display function, and a plurality of sub-pixels SP defined by the plurality of data lines DL and the plurality of gate lines GL are disposed, and driving circuits for driving the display panel DISP.

In the display panel DISP, the plurality of data lines DL may be disposed in a row direction (or column direction), and the plurality of gate lines GL may be disposed in the column direction (or row direction).

In the display panel DISP, a plurality of touch electrodes TE serving as a touch sensor and a plurality of touch lines TL electrically connected to the plurality of touch electrodes TE may be disposed.

For example, the plurality of touch electrodes TE may be disposed in a matrix form.

Each of the plurality of touch electrodes TE may have various forms. For example, one touch electrode TE may be a plate-shaped electrode having no opening, a mesh-shaped electrode having openings, or an electrode having several bent portions.

When the touch electrode TE is a plate-shaped electrode, it may be a transparent electrode. When the touch electrode TE is a mesh-shaped electrode or a bent electrode, it may be an opaque electrode.

For example, each of the plurality of touch electrodes TE may overlap with two or more sub-pixels SP.

For example, a plurality of touch lines TL may be disposed in parallel with a plurality of data lines DL. Referring to FIGS. 1 to 3, the driving circuits may include a data driving circuit DDC for driving a plurality of data lines DL, a gate driving circuit GDC for driving a plurality of gate lines GL, a display controller DCTR for controlling the data driving circuit DDC and the gate driving circuit GDC, etc, and may further include a touch driving circuit TDC for driving a plurality of touch electrodes TE.

The touch driving circuit TDC may supply, for touch sensing, a driving signal TDS to one or more touch electrodes TE through one or more of the plurality of touch lines TL.

The plurality of touch electrodes TE may be dedicated electrodes for touch sensing.

Alternatively, the plurality of touch electrodes TE may serve as a touch sensor, and may also serve as a display driving electrode used for driving the display. In this case, as an example, the plurality of touch electrodes TE may serve as a common electrode to which a common voltage VCOM required for driving the display is applied. Accordingly, the driving signal TDS applied, for touch sensing, to the touch electrode TE may also be a common voltage VCOM required for driving the display. Hereinafter, it will be described as an example that the plurality of touch electrodes TE serve as a common electrode and the driving signal TDS serves as a common voltage VCOM.

The display controller DCTR supplies various control signals (DCS, GCS) to the data driving circuit DDC and the gate driving circuit GDC to control the data driving circuit DDC and the gate driving circuit GDC.

The display controller DCTR starts scanning according to the timing implemented in each frame, converts an input image data input from the outside to be suitable for a data signal format used by the data driving circuit DDC and outputs the converted digital image data DATA, and controls the data driving at an appropriate time according to the scan.

The gate driving circuit GDC sequentially supplies gate signals of an on voltage or an off voltage to a plurality of gate lines GL under the control of the display controller DCTR.

When a specific gate line GL is opened by the gate driving circuit GDC, the data driving circuit DDC converts the image data signal received from the display controller DCTR into an image analog signal, so that a corresponding data signal VDATA is supplied to a plurality of data lines DL.

The display controller DCTR may be a timing controller used in a conventional display technology, or may be a control device that further performs other control function while including a timing controller, and may be a control device different from the timing controller.

The display controller DCTR may be implemented as a separate component from the data driving circuit DDC, or may be implemented as an integrated circuit together with the data driving circuit DDC.

The data driving circuit DDC drives the plurality of data lines DL by supplying a data signal VDATA to the plurality of data lines DL. Here, the data driving circuit DDC is also referred to as a 'source driver'.

The data driving circuit DDC may include at least one source driver integrated circuit SDIC. Each source driver integrated circuit SDIC may include a shift register, a latch circuit, a digital to analog converter DAC, an output buffer circuit, and the like. In some cases, each source driver integrated circuit SDIC may further include an analog-to-digital converter ADC.

Each source driver integrated circuit SDIC may be connected to a bonding pad of a display panel DISP by using a tape automated bonding TAB method or a chip-on-glass COG method, or directly disposed in the display panel DISP, or in some cases, may be integrated and disposed in the display panel DISP. In addition, each source driver integrated circuit SDIC may be implemented in a chip on film COF method of being mounted on a film connected to the display panel DISP.

The gate driving circuit GDC sequentially supplies a gate signal VGATE (also referred to as scan voltage, scan signal, or gate voltage) to the plurality of gate lines GL, thereby sequentially driving the plurality of gate lines GL. Here, the gate driving circuit GDC is also referred to as a 'scan driver'.

Here, the gate signal VGATE includes an off-level gate voltage that closes a corresponding gate line GL and an on-level gate voltage that opens the corresponding gate line GL.

More specifically, the gate signal VGATE includes an off-level gate voltage that turns off a transistor connected to the corresponding gate line GL and an on-level gate voltage that turns on the transistor connected to the corresponding gate line GL.

When the transistor is N-type, the off-level gate voltage may be a low-level gate voltage VGL, and the on-level gate voltage may be a high-level gate voltage VGH. When the transistor is a P-type, the off-level gate voltage may be a high-level gate voltage VGH, and the on-level gate voltage may be a low-level gate voltage VGL. In the following, for convenience of explanation, it is assumed that the off-level gate voltage is a low-level gate voltage VGL, and the on-level gate voltage is a high-level gate voltage VGH.

The gate driving circuit GDC may include at least one gate driver integrated circuit GDIC. Each gate driver integrated circuit GDIC may include a shift register, a level shifter, and the like.

Each gate driver integrated circuit GDIC may be connected to a bonding pad of a display panel DISP by using a tape automated bonding TAB method or a chip-on-glass COG method, or may be implemented in a gate-in-panel GIP type to be directly disposed in the display panel DISP, or in some cases, may be integrated and disposed in the display panel DISP. In addition, each gate driver integrated circuit GDIC may be implemented in a chip on film COF method of being mounted on a film connected to the display panel DISP.

The data driving circuit DDC may be located only in one side (e.g. the upper side or the lower side) of the display panel DISP, as shown in FIG. 1, and in some cases, may be located in both sides (e.g. the upper side and the lower side) of the display panel DISP according to the driving method, the panel design method, or the like.

The gate driving circuit GDC may be located only in one side (e.g. left side or right side) of the display panel DISP, as shown in FIG. 1, and in some cases, may be located in both sides (e.g. the left side and the right side) of the display panel DISP according to the driving method, the panel design method, or the like.

The touch display device according to the embodiments of the present disclosure may be various types of display devices such as a liquid crystal display device and an organic light emitting display device. The display panel DISP according to the embodiments of the present disclosure may be various types of display panels such as a liquid crystal display panel and an organic light emitting display panel.

Each sub-pixel SP disposed in the display panel DISP may include one or more circuit elements (e.g. transistors, capacitors, etc.).

For example, when the display panel DISP is a liquid crystal display panel, a pixel electrode PXL may be disposed in each sub-pixel SP, and a transistor TR may be disposed between the pixel electrode PXL and the data line DL. The transistor TR may be turned on by a gate signal VGATE supplied to a gate node through the gate line GL, and when turned on, output a data signal VDATA supplied to a source node (or drain node) through the data line DL to the drain node (or source node), and may apply the data signal VDATA to the pixel electrode PXL electrically connected to the drain node (or source node). An electric field is formed between the pixel electrode PXL to which the data signal VDATA is applied and the touch electrode TE to which the driving signal TDS corresponding to the common voltage VCOM is applied, and a capacitance may be formed between the pixel electrode PXL and the touch electrode TE. At this time, the touch electrode TE serves as a common electrode.

The structure of each sub-pixel SP may be variously determined according to a panel type, a provided function, and a design method.

Meanwhile, the plurality of touch electrodes TE mentioned above is a display driving electrode to which a driving signal TDS serving as a common voltage VCOM forming an electric field with the data signal VDATA when driving the display is applied, and is also a touch electrode for touch sensing.

Therefore, the driving signal TDS applied to the touch electrode TE is a signal for driving a display, and is also a signal for driving a touch. Therefore, in the following, the driving signal TDS is also referred to as a common voltage VCOM.

In other words, referring to FIGS. 2 and 3, the driving signal TDS serves as a display common voltage for forming a capacitance Cst with a data signal VDATA supplied to each of two or more sub-pixels SP overlapping a first touch electrode TE1, and forming the capacitance Cst with the data signal VDATA supplied to each of two or more sub-pixels SP overlapping a second touch electrode TE2.

In addition, the driving signal TDS may serve as a touch driving signal for driving the first touch electrode TE1 and the second touch electrode TE2 so as to detect whether there is a touch or to detect touch coordinate by differentially sensing the first touch electrode TE1 and the second touch electrode TE2.

Referring to FIGS. 2 and 3, the first touch electrode TE1 and the second touch electrode TE2 may be disposed in the same column or the same row.

Two or more data lines DL overlapping the first touch electrode TE1 may overlap the second touch electrode TE2. Two or more gate lines GL overlapping the first touch electrode TE1 do not overlap the second touch electrode TE2.

The plurality of touch lines TL may include a first touch line TL1 for electrically connecting the first touch electrode TE1 and the touch driving circuit TDC, and a second touch line TL2 for electrically connecting the second touch electrode TE2 and the touch driving circuit TDC. The first touch line TL1 may overlap the second touch electrode TE2 but may be insulated from the second touch electrode TL2 within the display panel DISP. In some cases, the first touch line TL1 and the second touch electrode TL2 may be electrically connected within the touch driving circuit TDC.

Referring to FIGS. 1 and 2, in order to provide a touch sensing function, a touch display device according to embodiments of the present disclosure may include a plurality of touch electrodes TE, a touch driving circuit TDC for sensing by driving a plurality of touch electrodes TE, a touch controller TCTR for sensing a touch by using a result of sensing the display panel DISP by the touch driving circuit TDC, and the like.

The plurality of touch electrodes TE corresponds to a touch sensor for sensing user's touch that is in contact with or close to a screen by user's touch object. Here, the user's touch object may be a finger or a pen.

The pen may be a passive pen having no signal transmission/reception function or an active pen having a signal transmission/reception function. The touch driving circuit TDC may supply a touch driving signal to the display panel DISP and sense the display panel DISP. The touch controller TCTR may sense a touch by using a result of sensing the display panel DISP by the touch driving circuit TDC. Here, the operation of sensing the touch may mean the operation of determining whether there is a touch and/or determining a touch coordinate.

The touch controller TCTR may be implemented as, for example, a micro control unit MCU, a processor, or the like.

The display controller DCTR and the touch controller TCTR may be separately implemented or may be integrally implemented.

The touch display device according to embodiments of the present disclosure may sense a touch based on self-capacitance of the touch electrode TE, or may sense a touch based on mutual-capacitance between the touch electrodes TE.

When the touch display device according to embodiments of the present disclosure senses a touch based on self-capacitance, the touch driving circuit TDC may supply a driving signal TDS having a signal form (signal waveform) whose voltage level fluctuates to one or more of the plurality of touch electrodes TE, and output sensing data by sensing a signal from the touch electrode TE to which the driving signal TDS is applied, and the touch controller TCTR may calculate a presence or absence of touch and/or a touch coordinate by using the sensing data.

When the touch display device according to embodiments of the present disclosure senses a touch based on mutual-capacitance, the touch driving circuit TDC may supply a driving signal TDS to the touch electrode TE serving as a driving electrode among a plurality of touch electrodes TE, and output a sensing data by sensing a signal from the touch electrode TE serving as a sensing electrode among a plurality of touch electrodes TE, and the touch controller TCTR may calculate the presence or absence of touch and/or the touch coordinate by using the sensing data.

In the following, for convenience of description, it is assumed that a touch display device according to embodiments of the present disclosure senses a touch based on self-capacitance. It is assumed that the display panel DISP is also configured as shown in FIGS. 2 and 3.

The driving signal TDS output from the touch driving circuit TDC may be a signal having a signal waveform whose voltage level is constant or a signal having a signal waveform whose voltage level fluctuates.

When the driving signal TDS is a signal whose voltage level fluctuates, the driving signal TDS may have a certain frequency and amplitude. The driving signal TDS may be, for example, various signal waveforms such as a sinusoidal wave shape, a triangular wave shape, or a square wave shape.

Meanwhile, the data driving circuit DDC may convert a digital image data DATA received from the display controller DCTR through a digital-to-analog converter DAC into an analog voltage type data signal VDATA.

The data driving circuit DDC may convert digital image data DATA into an analog voltage type data signal VDATA based on a plurality of gamma reference voltages GRV during digital-to-analog conversion.

The plurality of gamma reference voltages GRV are supplied from a gamma circuit GAM. The gamma circuit GAM may exist outside or inside the data driving circuit DDC.

Meanwhile, the ground voltage GND may be applied to the display panel DISP. The ground voltage GND may be a DC voltage or an AC voltage whose voltage level changes.

Figure 4:
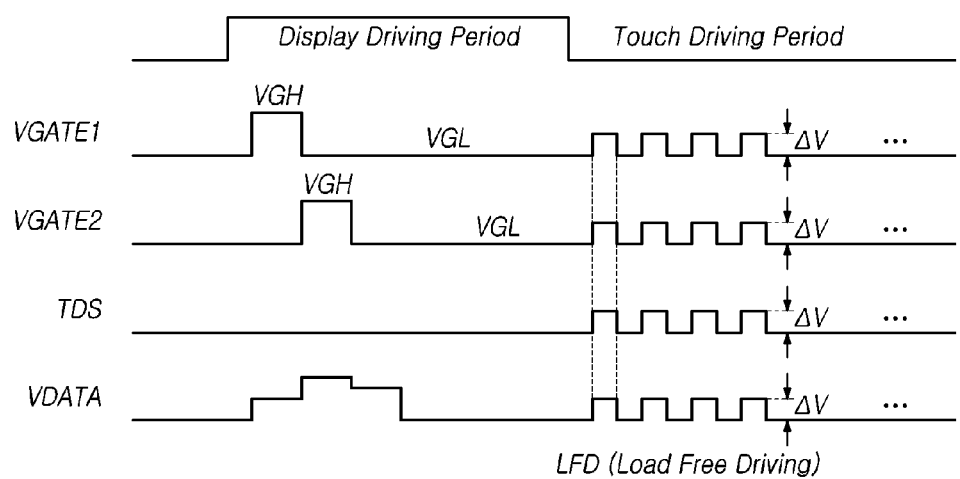
FIG. 4 is a time division driving timing diagram for display driving and touch driving of a touch display device according to embodiments of the present disclosure.

FIG. 4 is a time division driving timing diagram for display driving and touch driving of a touch display device according to embodiments of the present disclosure.

Referring to FIG. 4, the touch display device according to embodiments of the present disclosure may separately perform display driving and touch driving in a time-divided section. Such a driving method is referred to as a time division driving.

During the display driving period, a driving signal TDS in the form of a DC voltage having a constant voltage level is applied to the plurality of touch electrodes TE. In this case, the driving signal TDS may serve as a common voltage for driving the display. Gate signals VGATE1 and VGATE2 having turn-off level voltage VGL and turn-on level voltage VGH at scanning timing may be sequentially applied to the plurality of gate lines GL. Corresponding data signal VDATA may be applied to the plurality of data lines DL.

During the touch driving period after the display driving period, a driving signal TDS whose voltage level changes with time may be applied to all or part of the touch electrodes TE. In this case, the driving signal TDS may serve as a touch driving signal for touch sensing.

During the touch driving period, in order to reduce parasitic capacitance Ccc between the touch electrode TE to be sensed and other touch electrode TE, the touch display device may perform load free driving for the touch electrodes TE.

As the load-free driving for the touch electrodes TE is performed, a signal identical to or corresponding to the driving signal TDS applied to the touch electrode TE that is a sensing target may be applied to all or part of the plurality of touch electrodes TE disposed in the display panel DISP.

In addition, during the touch driving period, in order to reduce parasitic capacitance Cdc between the touch electrode TE and the data line DL, the touch display device may perform a load free driving for the data lines DL.

According to the execution of the load free driving for the data lines DL, a signal identical to or corresponding to the driving signal TDS applied to the touch electrode TE that is a sensing target may be applied to all or part of the plurality of data lines DL disposed in the display panel DISP.

In addition, during the touch driving period, in order to reduce parasitic capacitance Cgc between the touch electrode TE and the gate line GL, the touch display device may perform a load free driving for the gate lines GL.

According to the execution of the load free driving for the gate lines GL, a signal identical to or corresponding to the driving signal TDS applied to the touch electrode TE that is a sensing target may be applied to all or part of the plurality of gate lines GL disposed in the display panel DISP.

The operation of applying signals identical to or corresponding to the driving signal TDS to the touch electrodes TE, the data line DL, and the gate line GL, which are non-sensing targets disposed in the display panel DISP, during the touch driving period, is referred to as a load free driving LFD. Such a load free driving LFD reduces unnecessary parasitic capacitance Ccc, Cgc, Cdc, thereby reducing touch sensitivity degradation due to parasitic capacitance.

The frequency and phase of signals applied to the touch electrode TE, the data line DL, and the gate line GL which are non-sensing targets disposed in the display panel DISP, during the touch driving period, may correspond to the frequency and phase of driving signal TDS applied to the touch electrode TE which is a sensing target.

In addition, the amplitude ΔV of signals applied to the touch electrode TE, the data line DL, and the gate line GL which are non-sensing targets disposed in the display panel DISP, during the touch driving period, may correspond to the amplitude ΔV of driving signal TDS applied to the touch electrode TE which is a sensing target.

Figure 5:
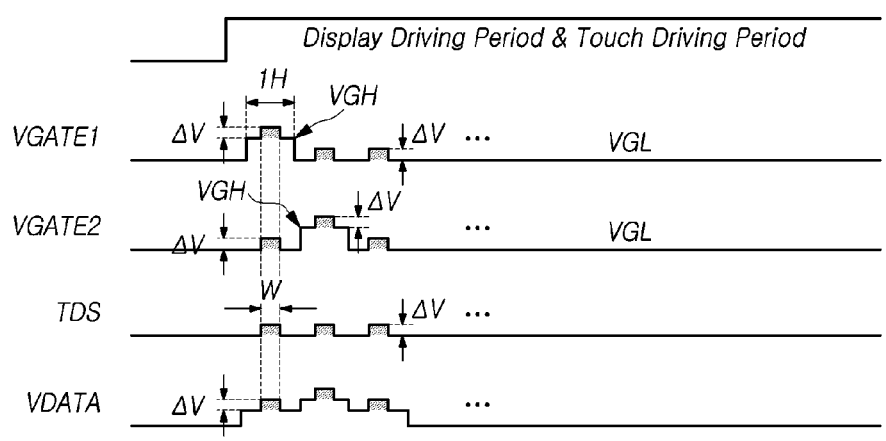
FIG. 5 and FIG. 6 are simultaneous driving timing diagrams for display driving and touch driving of a touch display device according to embodiments of the present disclosure.
Figure 6:
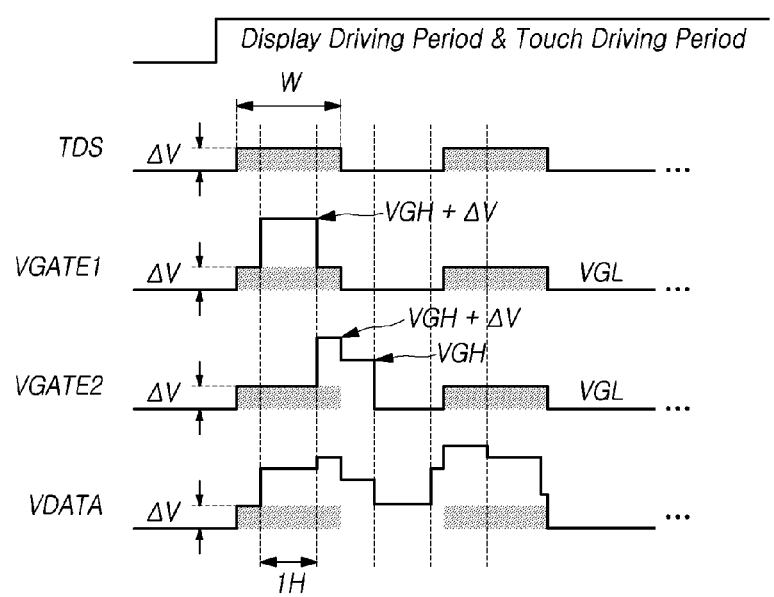

FIG. 5 and FIG. 6 are simultaneous driving timing diagrams for display driving and touch driving of a touch display device according to embodiments of the present disclosure.

Referring to FIGS. 5 and 6, a touch display device according to embodiments of the present disclosure may simultaneously perform display driving and touch driving. This driving method is referred to as a simultaneous driving.

Referring to FIGS. 5 and 6, while a data signal VDATA for image display is supplied to a plurality of data lines DL and display driving is performed, the touch driving circuit TDC may supply a driving signal TDS that swings with a certain amplitude ΔV to a plurality of touch electrodes TE.

Here, the driving signal TDS may be a signal whose voltage level is swinging (changing). The driving signal TDS is also referred to as a modulated signal, an AC signal, or a pulse signal.

Referring to FIG. 5, the width W of the high-level voltage period of the driving signal TDS may be shorter than one horizontal time 1H for display driving.

In this case, the voltage level of the driving signal TDS may change one or more times, during a high level voltage period of the data signal VDATA for image display supplied to at least one data line DL among the plurality of data lines DL, or during a high level voltage period of the gate signal VGATE supplied to at least one gate line GL among the plurality of gate lines GL.

In other words, the data signal VDATA applied to the data line DL has a form in which an original signal portion for displaying an image and a driving signal TDS are added. Accordingly, a voltage change point identical to the amplitude ΔV of the driving signal TDS may exist in the data signal VDATA.

Referring to FIG. 6, the width W of the high-level voltage period of the driving signal TDS may be longer than one horizontal time 1H for display driving.

In this case, during the high level voltage period of the driving signal TDS, the voltage level of the data signal VDATA for image display supplied to at least one data line DL among the plurality of data lines DL may change one or more times, or the voltage level of the gate signal VGATE supplied to at least one gate line GL among the plurality of gate lines GL may change one or more times.

Referring to FIGS. 5 and 6, during simultaneous driving, the data signal VDATA applied to the data line DL has a form in which an original signal portion for displaying an image and a driving signal TDS are added. Accordingly, a voltage change point identical to the amplitude $\Delta V$ of the driving signal TDS may exist in the data signal VDATA.

Referring to FIGS. 5 and 6, during simultaneous driving, the gate signal VGATE applied to the gate line GL has a form in which an original signal portion for driving the gate and a driving signal TDS are added. Accordingly, a voltage change point identical to the amplitude $\Delta V$ of the driving signal TDS may exist in the gate signal VGATE.

As described above, the data signal VDATA has a voltage change point identical to the amplitude $\Delta V$ of the driving signal TDS. Accordingly, when a portion corresponding to the driving signal TDS is removed from the data signal VDATA, it becomes the same state as the data signal VDATA in the display driving period during a time division driving.

Similarly, as the gate signal VGATE has a voltage change point identical to the amplitude $\Delta V$ of the driving signal TDS, when a portion corresponding to the driving signal TDS is removed from the gate signal VGATE, it becomes the same state as the gate signal VGATE in the display driving period during a time division driving.

The fact that the data signal VDATA has the same voltage change point as the amplitude $\Delta V$ of the driving signal TDS, and the gate signal VGATE has the same voltage change point as the amplitude $\Delta V$ of the driving signal TDS can be said that the data signal VDATA and the gate signal VGATE are modulated based on the driving signal TDS.

As described above, during simultaneous driving, even if the display driving and the touch driving are simultaneously performed, the display driving may not be affected by the touch driving, by changing (modulating) the signal waveforms of the data signal VDATA and the gate signal VGATE.

In addition, the operation of changing the signal waveforms of the data signal VDATA and the gate signal VGATE corresponds to a kind of load free driving that improves touch sensitivity by reducing unnecessary parasitic capacitance (Ccc, Cgc, Cdc).

For example, simultaneous driving may be performed through a gamma modulation scheme or a ground modulation scheme.

In the case of the gamma modulation scheme, the data driving circuit DDC performs digital-to-analog conversion processing by using a gamma reference voltage GRV corresponding to the driving signal TDS in the frequency, phase, and amplitude $\Delta V$ when converting the digital image data DATA to the analog voltage type data signal VDATA, thereby changing the data signal VDATA.

In addition, the above-described gate signal VGATE may be generated by changing each of the turn-off level voltage VGL and the turn-on level voltage VGH required to generate the gate signal VGATE to correspond to the driving signal TDS in the frequency, phase, and amplitude $\Delta V$.

In the case of the ground modulation scheme, the ground voltage GND applied to the display panel DISP is a signal whose voltage level is changed, and the ground modulation scheme is a method that swings all kinds of signals applied to the display panel DISP based on the ground voltage GND, by allowing the ground voltage GND to correspond to the driving signal TDS in the frequency and phase.

Meanwhile, the touch display device according to the embodiments of the present disclosure may simultaneously drive, and may perform time division driving at some timing.

Figure 7:
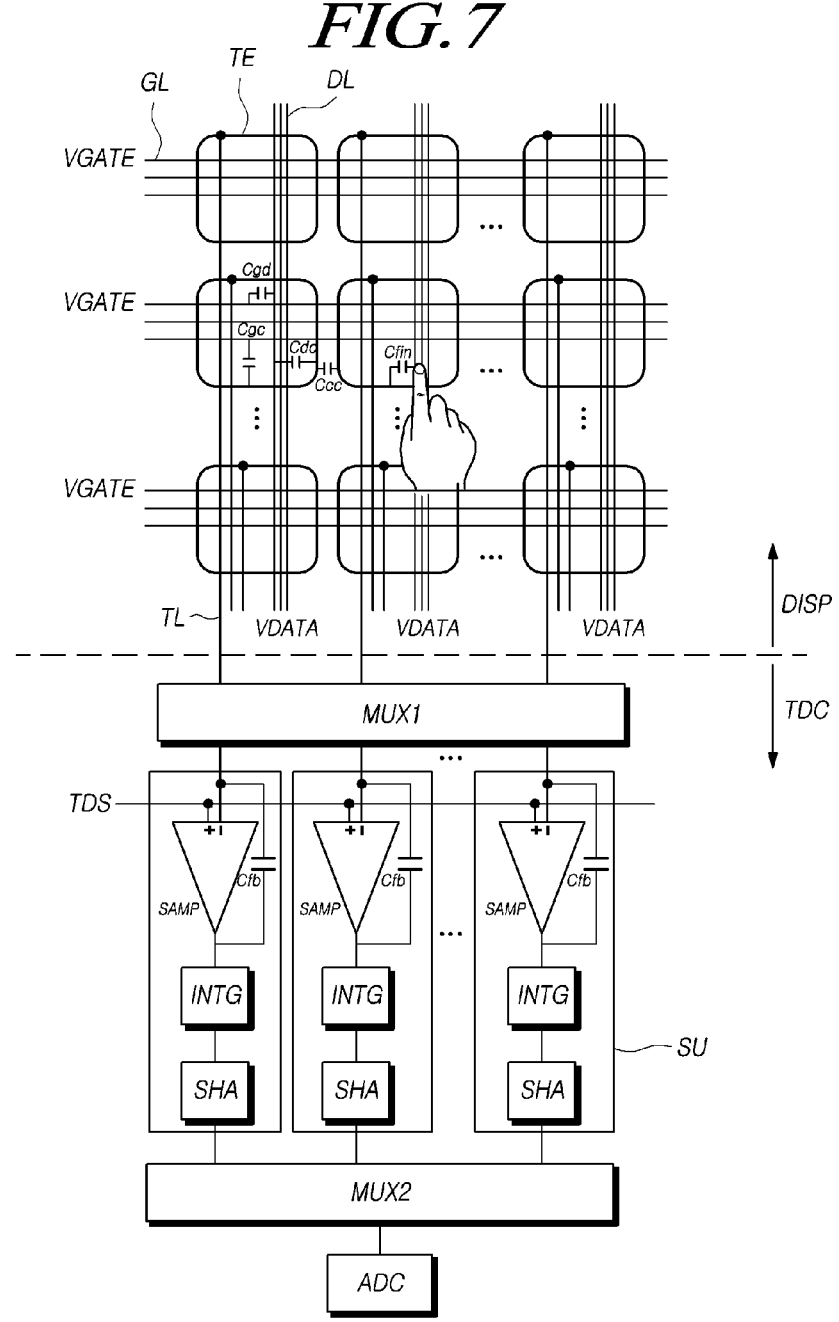
FIG. 7 is a diagram illustrating a single sensing circuit in a touch display device according to embodiments of the present disclosure.

FIG. 7 is a diagram illustrating a single sensing circuit in a touch display device according to embodiments of the present disclosure.

Referring to FIG. 7, a touch driving circuit TDC of a touch display device according to embodiments of the present disclosure may include a first multiplexer circuit MUX1, a plurality of sensing units SU, a second multiplexer circuit MUX2, and an analog-to-digital converter ADC.

The first multiplexer circuit MUX1 selects the touch electrode TE corresponding to the number of the plurality of sensing units SU from among the plurality of touch electrodes TE as a sensing electrode.

Each of the plurality of sensing units SU may include a single-ended amplifier SAMP, an integrator INTG, a sample and hold circuit SHA, and the like.

The single-ended amplifier SAMP may supply the driving signal TDS input to a non-inverting input terminal to the touch electrode TE through an inverting input terminal.

In addition, the single-ended amplifier SAMP receives a signal in the form of a charge from the touch electrode TE through the inverting input terminal and charges it in a feedback capacitor Cfb, and outputs voltage according to the charge charged in the feedback capacitor Cfb.

The integrator INTG integrates the output voltage of the single-ended amplifier SAMP and outputs an integral value. The integrator INTG may be composed of an operational amplifier, a feedback capacitor, and the like, similarly to the single-ended amplifier SAMP.

The sample and hold circuit SHA may store and output an output integral value of the integrator INTG.

The second multiplexer circuit MUX2 selects one of the plurality of sensing units SU and outputs a final output value of the selected sensing unit SU to an analog-to-digital converter ADC.

The analog-to-digital converter ADC converts the input value to a sensing value corresponding to a digital value.

The touch driving circuit TDC provides sensing data including the sensing value converted by the analog-to-digital converter ADC to the touch controller TCTR.

The touch controller TCTR may detect whether there is a touch and/or detect a touch coordinate based on the sensing data.

Meanwhile, during time division driving, in the touch driving period, through load free driving, the parasitic capacitance Cgc between the touch electrode TE that is a sensing target and the gate line GL, a parasitic capacitance Ccc between the touch electrode TE that is a sensing target and other touch electrode TE, and a parasitic capacitance Cdc between the touch electrode TE that is a sensing target and the data line DL may be reduced.

In addition, during the simultaneous driving, the data signal VDATA and the gate signal VGATE have the same voltage change point as the amplitude $\Delta V$ of the driving signal TDS, and become the same as the load-free driving. Accordingly, the parasitic capacitance Cgc between the touch electrode TE that is a sensing target and the gate line GL, a parasitic capacitance Ccc between the touch electrode TE that is a sensing target and other touch electrode TE, and a parasitic capacitance Cdc between the touch electrode TE that is a sensing target and the data line DL may be reduced.

Meanwhile, in the touch driving circuit TDC with reference to FIG. 7, each of the plurality of sensing units SU senses one touch electrode TE at a time. This is referred to as a single sensing method. This single sensing method is a sensing method using a single-ended amplifier SAMP.

Meanwhile, according to the time division driving described above, a display driving time or a touch driving time may be insufficient. In particular, this may be worse in the case of a high-resolution large-area display panel DISP.

In comparison, in the case of simultaneous driving, the disadvantage of time division driving can be overcome.

However, when simultaneously driving is performed in a single sensing method using a single-ended amplifier SAMP, since the display driving and the touch driving must be performed simultaneously, it may be difficult to perform a precise signal control. When the display driving proceeds at a faster speed than the touch driving (e.g. as shown in FIG. 6, when one horizontal time 1H for display driving is shorter than the width W of the high level voltage period of the driving signal TDS), there is a disadvantage in that the noise of the touch sensing data may become worse.

Figure 8:
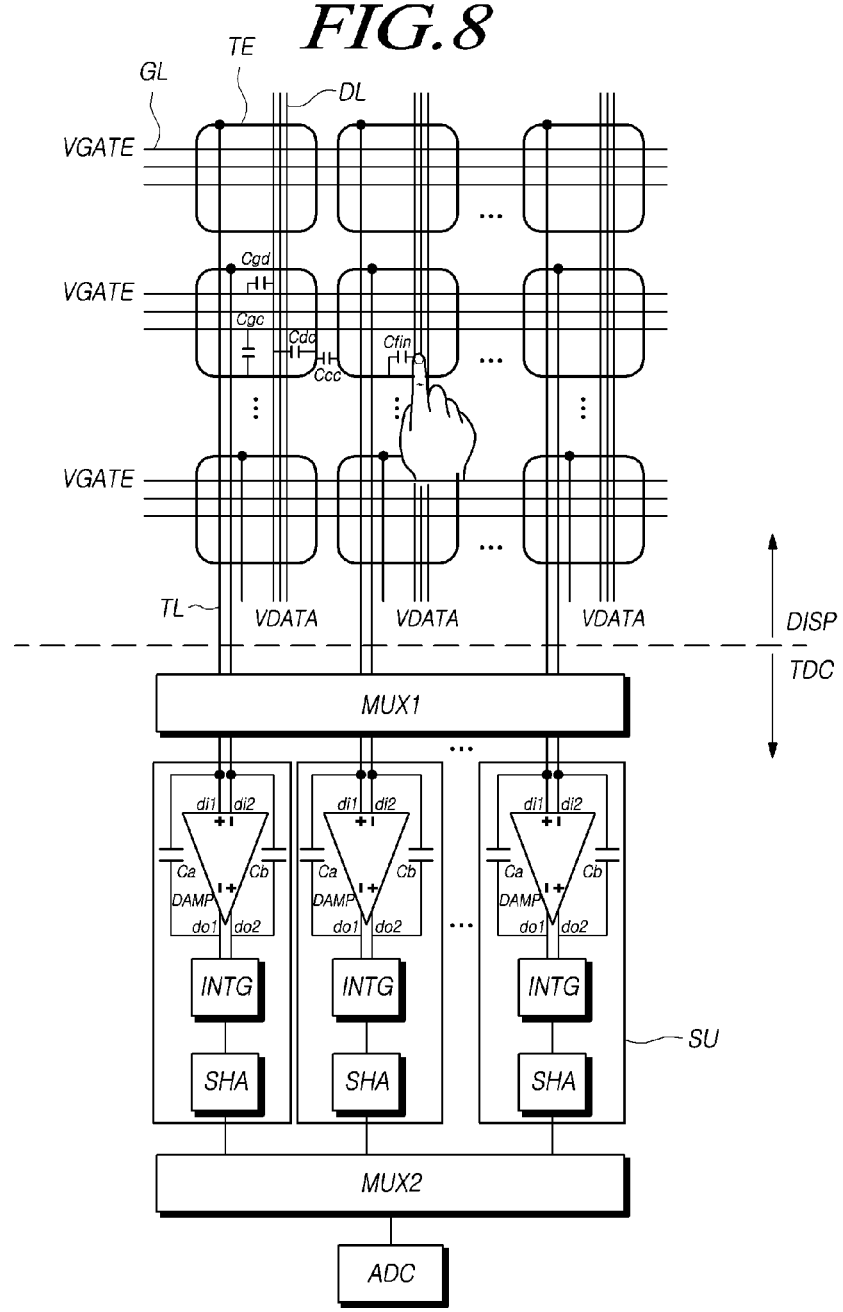
FIG. 8 is a diagram illustrating a differential sensing circuit in a touch display device according to embodiments of the present disclosure.
Figure 9:
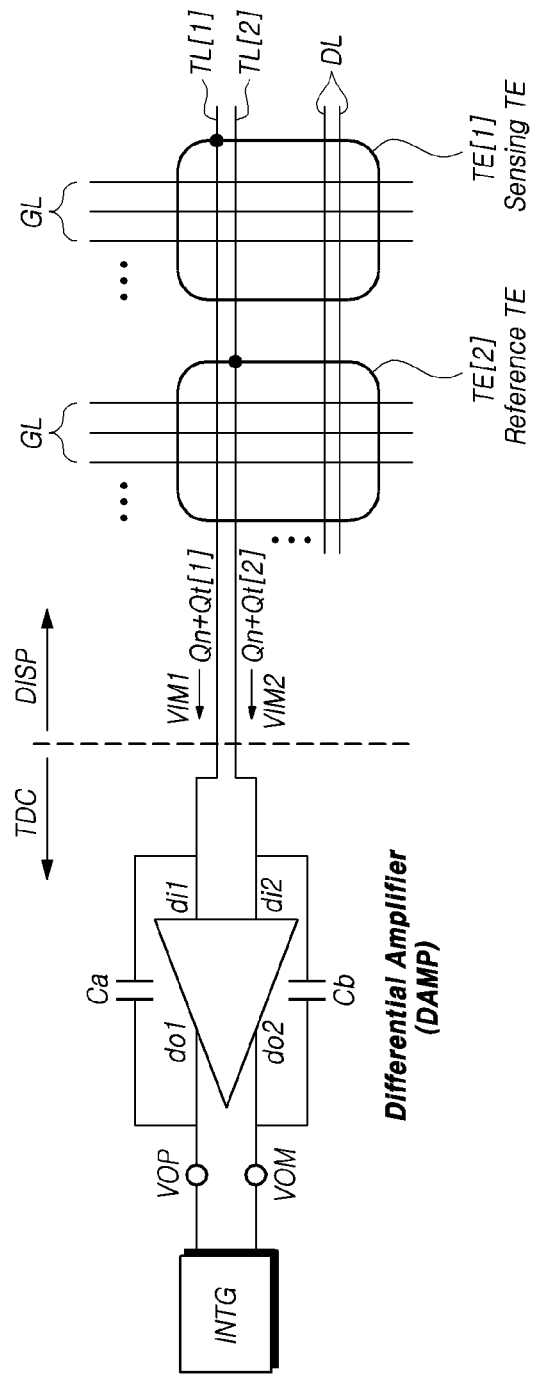
FIG. 9 is a diagram illustrating a situation in which noise generated in a touch electrode column is input to a differential amplifier during differential sensing of a touch display device according to embodiments of the present disclosure.

Accordingly, in order to overcome the disadvantage of simultaneous driving, simultaneous driving may be performed by a differential sensing method in which two touch electrodes TE are differentially sensed simultaneously. The differential sensing method may typically use a differential amplifier rather than a single-ended amplifier SAMP. FIG. 8 is a diagram illustrating a differential sensing circuit in a touch display device according to embodiments of the present disclosure. FIG. 9 is a diagram illustrating a situation in which noise generated in a touch electrode column is input to a differential amplifier DAMP during differential sensing of a touch display device according to embodiments of the present disclosure.

Referring to FIGS. 8 and 9, in the case of a differential sensing method, in the touch driving circuit TDC, the first multiplexer circuit MUX1 may select two touch electrodes TE to be differentially sensed by each of the plurality of sensing units SU.

The first multiplexer circuit MUX1 may electrically connect two touch electrodes TE to be differentially sensed and a corresponding sensing unit SU.

Each of the plurality of sensing units SU differentially senses the two touch electrodes TE selected by the first multiplexer circuit MUX1.

To this end, each of the plurality of sensing units SU may include a differential amplifier DAMP.

Referring to FIG. 9, the differential amplifier DAMP may receive a first input signal VIM1 and a second input signal VIM2 from each of the first touch electrode TEM and the second touch electrode TE[2] through a first input terminal di1 and a second input terminal dig, differentially amplify the first input signal VIM1 and the second input signal VIM2, and output a first output signal VOP and a second output signal VOM through a first output terminal do1 and a second output terminal do2.

The differential amplifier DAMP performs differential amplification to output a first output signal VOP and a second output signal VOM having a difference proportional to the difference between the first input signal VIM1 and the second input signal VIM2.

In the differential amplifier DAMP, a first capacitor Ca is connected between a first input terminal di1 and the first output terminal do1, and a second capacitor Cb may be connected between a second input terminal di2 and the second output terminal do2.

When performing simultaneous driving, if the data signal VDATA and the gate signal VGATE are modulated based on the driving signal TDS, the influence of the parasitic capacitance (Cdc, Cgc) may be canceled by the data line DL and the gate line GL, thereby easily achieving determination of the touch.

However, the display signal itself, such as the data signal VDATA and the gate signal VGATE, cannot be canceled, and thus act as noise in determining the touch. In particular, the data signal VDATA has a feature close to random noise that is unpredictable because it is a value that fluctuates greatly depending on the image. Therefore, during simultaneous driving, in order to reduce the noise effect caused by the data line DL, the above-described differential sensing method may be advantageous in comparison with the single sensing method.

In order to cancel the noise effect due to the voltage fluctuation of the data signal VDATA in the data line DL, as shown in FIG. 9, two touch electrodes TE[1] and TE[2] overlapping the same data lines DL must be differentially sensed.

When a voltage fluctuation of the data signal VDATA occurs while differentially sensing the two touch electrodes TE[1] and TE[2] overlapping the same data lines DL, a charge change occurs through the parasitic capacitance Cdc between the data lines DL and the two touch electrodes TE[1] and TE[2]. This is referred to as a noise charge Qn. In other words, the noise charge Qn may occur in a portion where the driving signal TDS and the data signal VDATA have a difference.

Since the data lines DL overlapping the first touch electrode TE[1] and the data lines DL overlapping the second touch electrode TE[2] are the same, the noise charges Qn generated in the first and second input terminals di1 and di2 of the differential amplifier DAMP are the same.

Accordingly, the first input signal VIM1 input to the first input terminal di1 of the differential amplifier DAMP is a signal corresponding to the charge Qt[1]+Qn which is the sum of the touch charge Qt[1] generated by the first touch electrode TE[1] and the noise charge Qn generated by the data lines DL. The second input signal VIM2 input to the second input terminal di2 of the differential amplifier DAMP is a signal corresponding to the charge Qt[2]+Qn which is the sum of the touch charge Qt[2] generated by the second touch electrode TE[2] and the noise charge Qn generated by the data lines DL.

Thus, the voltage change occurs in the first and second input terminals di1 and di2 of the differential amplifier DAMP due to the noise charge Qn. Due to this, the correct data signal VDATA is not charged in the sub-pixels SP corresponding to the data lines DL, thereby degrading image quality.

Accordingly, in the case of a differential sensing method using a differential amplifier DAMP, a separate circuit may be required to stabilize the voltage of the driving signal TDS in the front end of the differential amplifier DAMP. In addition, in the case of a differential sensing method using a differential amplifier DAMP, the differential amplifier DAMP requires two feedback capacitors Ca and Cb, which may cause a disadvantage that the circuit area is enlarged. In addition, in the case of a differential sensing method using a differential amplifier DAMP, the integrator INTG may also include two feedback capacitors, which may cause an enlarged circuit area. Accordingly, embodiments of the present disclosure propose a new circuit structure for differential sensing.

Figure 10:
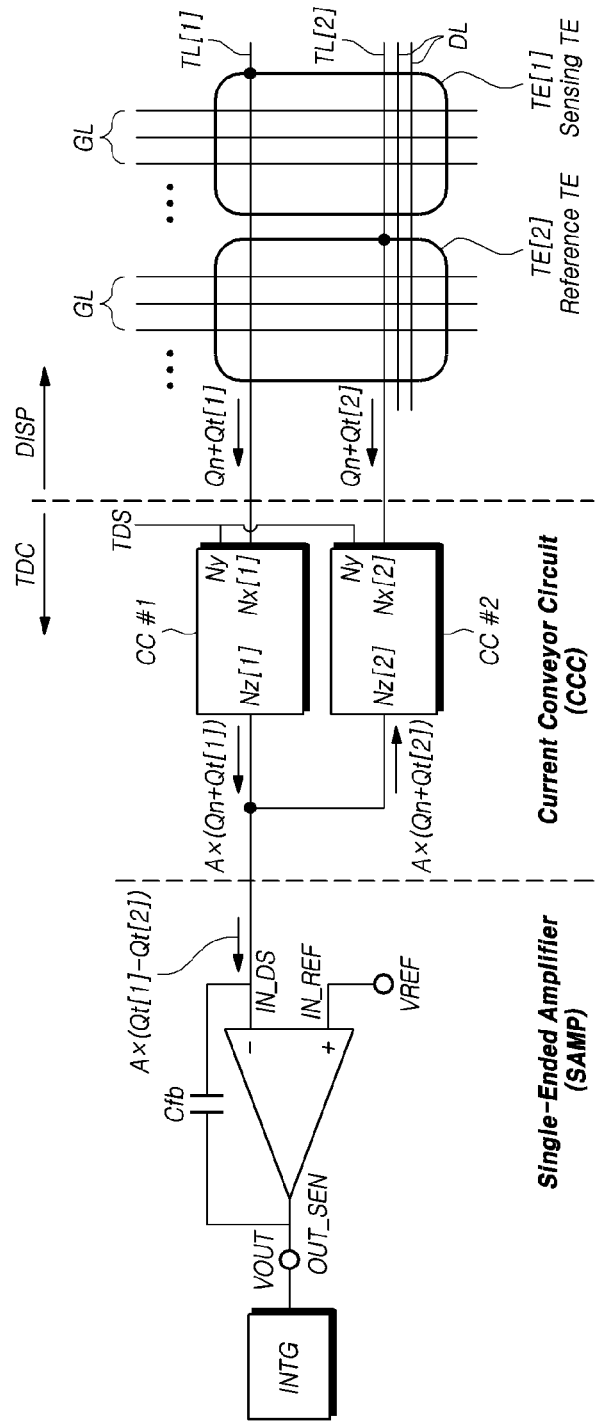
FIG. 10 is a diagram illustrating a differential sensing circuit using a single-ended amplifier in a touch display device according to embodiments of the present disclosure.

FIG. 10 is a diagram illustrating a differential sensing circuit using a single-ended amplifier SAMP in a touch display device according to embodiments of the present disclosure.

Referring to FIG. 10, the touch display device according to the embodiments of the present disclosure does not differentially sense two touch electrodes (sensing touch electrode, reference touch electrode) using a differential amplifier DAMP as shown in FIGS. 8 and 9, but can differentially sense the first touch electrode TE[1] which is a sensing touch electrode to be actually sensed, and the second touch electrode TE[2] which is a reference touch electrode, as a reference, by using a single-ended amplifier SAMP.

To this end, the touch display device according to the embodiments of the present disclosure may include a current conveyor circuit CCC for controlling the current direction so that the flow direction of a first input charge (Qn+Qt[1]) flowing from the first touch electrode TE[1] corresponding to the sensing touch electrode may be opposite to the flow direction of a second input charge (Qn+Qt[2]) flowing from the second touch electrode TE[2] corresponding to the reference touch electrode.

The single-ended amplifier SAMP may receive the charges (A×(Qt[1]−Qt[2])) that are obtained as the charges (A×(Qn+Qt[1]), A×(Qn+Qt[2])), which are output by controlling the flow direction in the current conveyor circuit CCC, are collected in one place, and may output a corresponding output signal VOUT.

Here, the charges (A×(Qt[1]−Qt[2])) that are obtained as the charges (A×(Qn+Qt[1]), A×(Qn+Qt[2])), which are output by controlling the flow direction in the current conveyor circuit (CCC), are collected in one place, and are inputted to the single-ended amplifier SAMP are a differential signal (A×(Qn+Qt[1])−A×(Qn+Qt[2])) of the charges ((A×(Qn+Qt[1]), A×(Qn+Qt[2])) output by controlling the flow direction in the current conveyor circuit CCC. In addition, the output signal VOUT of the single-ended amplifier SAMP is a differential output signal corresponding to a differential signal (A×(Qn+Qt[1])−A×(Qn+Qt[2])=A×(Qt[1]−Qt[2])).

This will be described again in more detail below.

Referring to FIG. 10, the current conveyor circuit CCC of the touch driving circuit TDC may include a first current conveyor CC #1 connected to the first touch electrode TE[1] corresponding to the sensing touch electrode among the plurality of touch electrodes TE, and a second current conveyor CC #2 connected to the second touch electrode TE[2] corresponding to the reference touch electrode among the plurality of touch electrodes TE.

Referring to FIG. 10, the first current conveyor CC #1 may include a first touch node terminal Nx[1] which receives the first input charge (Qn+Qt[1]) from the first touch electrode TE[1] corresponding to the sensing touch electrode among the plurality of touch electrodes TE, and a first outflow terminal through which a first transfer charge (A×(Qn+Qt[1])) corresponding to the first input charge (Qn+Qt[1]) flows out, as a first output node terminal Nz[1].

Referring to FIG. 10, the second current conveyor CC #2 may include a second touch node terminal Nx[2] which receives the second input charge (Qn+Qt[2]) from the second touch electrode TE[2] corresponding to the reference touch electrode among the plurality of touch electrodes TE, and a second inflow terminal through which a second transfer charge (A×(Qn+Qt[2])) corresponding to the second input charge (Qn+Qt[2]) flows in, as a second output node terminal Nz[2].

Referring to FIG. 10, the single-ended amplifier SAMP may include a sensing input terminal IN_DS to which the first current conveyor CC #1 and the second current conveyor CC #2 are commonly connected, a reference input terminal IN_REF to which the reference voltage VREF is applied, an amplification output terminal OUT_SEN that outputs an output signal VOUT, etc.

In the sensing input terminal IN_DS of the single-ended amplifier SAMP, a first outflow terminal (OUTP in FIG. 13) selected as a first output node terminal Nz[1] among the first outflow terminal (OUTP in FIG. 13) and a first inflow terminal (OUTM in FIG. 13) of the first current conveyor CC #1 may be electrically connected to a second inflow terminal (OUTM in FIG. 14) selected as a second output node terminal Nz[2] among a second outflow terminal (OUTP in FIG. 14) of the second current conveyor CC #2 and the second inflow terminal (OUTM in FIG. 14) of the second current conveyor CC #2.

The amplification output terminal OUT_SEN of the single-ended amplifier SAMP may output a differential output signal VOUT corresponding to a signal input to the sensing input terminal IN_DS. Here, the signal input to the sensing input terminal IN_DS is a differential charge (A×(Qt[1]−Qt[2])) between the first transfer charge (A×(Qn+Qt[1])) and the second transfer charge (A×(Qn+Qt[2])).

As described above, a differential signal (A×(Qt[1]−Qt[2]) is generated through the control of current flow direction through a current conveyor circuit CCC, and a corresponding differential output signal VOUT can be output from the single-ended amplifier SAMP. Therefore, the effect identical to the differential sensing effect using the differential amplifier DAMP can be obtained although not using the differential amplifier DAMP.

Referring to FIG. 10, the differential sensing circuit using a single-ended amplifier SAMP in the touch display device according to embodiments of the present disclosure does not use two feedback capacitors Ca and Cb of the differential amplifier DAMP, but uses one feedback capacitor Cfb of the single-ended amplifier SAMP. The circuit area can be greatly reduced due to the reduction in the number of capacitors that can occupy a significant portion of the circuit area corresponding to the touch driving circuit TDC.

In the case of the differential sensing circuit using a single-ended amplifier SAMP in a touch display device according to embodiments of the present disclosure, a current conveyor circuit CCC is added. However, the reduction in the circuit area due to the reduction in the number of capacitors is much larger than the increase in the circuit area due to the current conveyor circuit CCC.

In addition, the integrator INTG connected to the output terminal of the differential amplifier DAMP must have two feedback capacitors. However, due to the single-ended amplifier SAMP, the integrator INTG integrating the differential output signal VOUT of the single-ended amplifier SAMP may also have only one feedback capacitor. The number of capacitors can be further reduced in the touch driving circuit TDC, thereby further reducing the circuit area.

The first current conveyor CC #1 may have a unique first output gain A, and the second current conveyor CC #2 may have a unique second output gain A. Each of the first output gain A and the second output gain A may be a real number other than zero. The first output gain A and the second output gain A may be the same or different from each other. Considering that the output charge flow direction of each of the first current conveyor CC #1 and the second current conveyor CC #2 is opposite, the signs of the first output gain A and the second output gain A may be opposite.

Therefore, the first transfer charge (A×(Qn+Qt[1])) corresponding to the output of the first current conveyor CC #1 may be determined according to the first input charge Qn+Qt[1] corresponding to the input of the first current conveyor CC #1 and the first output gain A of the first current conveyor CC #1.

The second transfer charge (A×(Qn+Qt[2])) corresponding to the output of the second current conveyor CC #2 may be determined according to the second input charge Qn+Qt[2] corresponding to the input of the second current conveyor CC #2 and the second output gain A of the second current conveyor CC #2.

Referring to FIG. 10, in the first transfer charge (A×(Qn+Qt[1])) flowing out through the first outflow terminal (OUTP in FIG. 13) selected as the first output node terminal Nz[1] among the first outflow terminal (OUTP in FIG. 13) and the first inflow terminal (OUTM in FIG. 13) of the first current conveyor CC #1, the charge is reduced as much as the second transfer charge (A×(Qn+Qt[2])) flowing into the second inflow terminal (OUTM in FIG. 14) selected as the second output node terminal Nz[2] among the second outflow terminal (OUTP in FIG. 14) and the second inflow terminal (OUTM in FIG. 14) of the second current conveyor CC #2.

Referring to FIG. 10, the differential charge (A×(Qt[1]−Qt[2])) input to the sensing input terminal IN_DS of the single-ended amplifier SAMP is the charge that is reduced as much as the second transfer charge (A×(Qn+Qt[2])) from the first transfer charge (A×(Qn+Qt[1])).

Referring to FIG. 10, the differential charge (A×(Qt[1]−Qt[2])) input to the sensing input terminal IN_DS of the single-ended amplifier SAMP may be a charge that canceled out the noise charge Qn that is commonly included in the first transfer charge (A×(Qn+Qt[1])) and the second transfer charge (A×(Qn+Qt[2])).

Referring to FIG. 10, the first current conveyor CC #1 may include a first driving terminal Ny to which a driving signal TDS is input. The second current conveyor CC #2 may include a second driving terminal Ny to which the driving signal TDS is input.

The driving signal TDS input to the first driving terminal Ny of the first current conveyor CC #1 and the driving signal TDS input to the second driving terminal Ny of the second current conveyor CC #2 may be the same signal, and have a signal waveform whose voltage level fluctuates or have a signal waveform whose voltage level is constant.

For example, the touch driving circuit TDC may supply a driving signal TDS having a signal waveform selected from among a signal waveform whose voltage level fluctuates depending on the type of touch object to be sensed and a signal waveform having a constant voltage level to the first driving terminal Ny and the second driving terminal Ny.

As an example, when sensing a finger or a passive pen as a touch object, the touch driving circuit TDC may supply a driving signal TDS having a signal waveform whose voltage level fluctuates to the first driving terminal Ny and the second driving terminal Ny. Here, the passive pen is a pen having no signal transmission/reception function and is a touch object having electrical characteristics similar to finger.

As another example, when sensing an active pen as a touch object, the touch driving circuit TDC may supply a driving signal TDS having a signal waveform whose voltage level does not fluctuate to the first driving terminal Ny and the second driving terminal Ny. Here, the active pen is a pen having a signal transmission/reception function. The active pen may receive a signal applied to one or more touch electrodes TE by the touch driving circuit TDC, or output a pen signal to be applied to one or more touch electrodes TE.

The pen signal applied to the one or more touch electrodes TE may be sensed by the touch driving circuit TDC.

The reference voltage VREF input to the reference input terminal IN_REF of the single-ended amplifier SAMP may have a signal waveform whose voltage level fluctuates or a signal waveform whose voltage level is constant. The signal waveform of the reference voltage VREF may not be related to the signal waveform of the driving signal TDS.

The first touch electrode TE[1] and the second touch electrode TE[2] mentioned above may be a touch electrode (sensing touch electrode) to be sensed at a certain timing and a touch electrode (reference touch electrode) that becomes a reference for sensing touch electrode The size of the area occupied by each of the first touch electrode TE[1] and the second touch electrode TE[2] may be greater than or equal to the size of the area occupied by two or more sub-pixels SP.

The area occupied by each of the first touch electrode TE[1] and the second touch electrode TE[2] may overlap with an area occupied by two or more sub-pixels SP. In this case, the first touch electrode TE[1] may overlap two or more data lines DL, and the second touch electrode TE[2] may overlap two or more data lines DL. The first touch electrode TE[1] may overlap two or more gate lines GL, and the second touch electrode TE[2] may overlap two or more gate lines GL.

The first touch electrode TE[1] and the second touch electrode TE[2] may be disposed in the same column or in the same row.

For example, when the data lines DL is disposed in a column direction, and the first touch electrode TE[1] and the second touch electrode TE[2] are disposed in the same column, two or more data lines DL overlapping the first touch electrode TE[1] and two or more data lines DL overlapping the second touch electrode TE[2] may be the same. Two or more gate lines GL overlapping the first touch electrode TE[1] and two or more gate lines GL overlapping the second touch electrode TE[2] may be different from each other.

The touch driving circuit TDC may apply the driving signal TDS to the first touch electrode TE[1] and the second touch electrode TE[2], while a data signal VDATA for displaying an image is supplied to a plurality of data lines DL to drive the display.

When the driving signal TDS has a signal waveform whose voltage level fluctuates, the width W of the high-level voltage period of the driving signal TDS may be shorter than one horizontal time 1H for display driving (See FIG. 5).

When the driving signal TDS has a signal waveform whose voltage level fluctuates, the width W of the high-level voltage period of the driving signal TDS may be longer than one horizontal time 1H for display driving (See FIG. 6).

As an example for simultaneous driving, the data driving circuit DDC may convert digital image data into an image analog signal based on the gamma reference voltage GRV and output the data signal VDATA.

The gamma reference voltage GRV may correspond to the driving signal TDS input to the first and second current conveyors CC #1 and CC #2 with respect to one or more of the frequency, phase, amplitude, and the like.

As another example for simultaneous driving, the ground voltage GND applied to the display panel DISP is a signal whose voltage level is changed, and may correspond to the driving signal TDS with respect to one or more of the frequency, phase, amplitude, and the like.

The first current conveyor CC #1 and the second current conveyor CC #2 shown in FIG. 10 have the same circuit configuration. However, according to the roles (sensing touch electrode, reference touch electrode) of the touch electrodes (TE[1] and TE[2]) connected to each of the first current conveyor CC #1 and the second current conveyor CC #2, only the type of the output node terminal connected to the sensing input terminal IN_DS of the single-ended amplifier SAMP becomes different.

Figure 11:
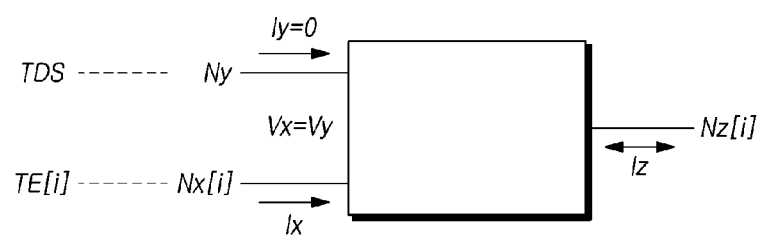
FIG. 11 is a diagram briefly illustrating a current conveyor of a touch display device according to embodiments of the present disclosure.
Figure 12:
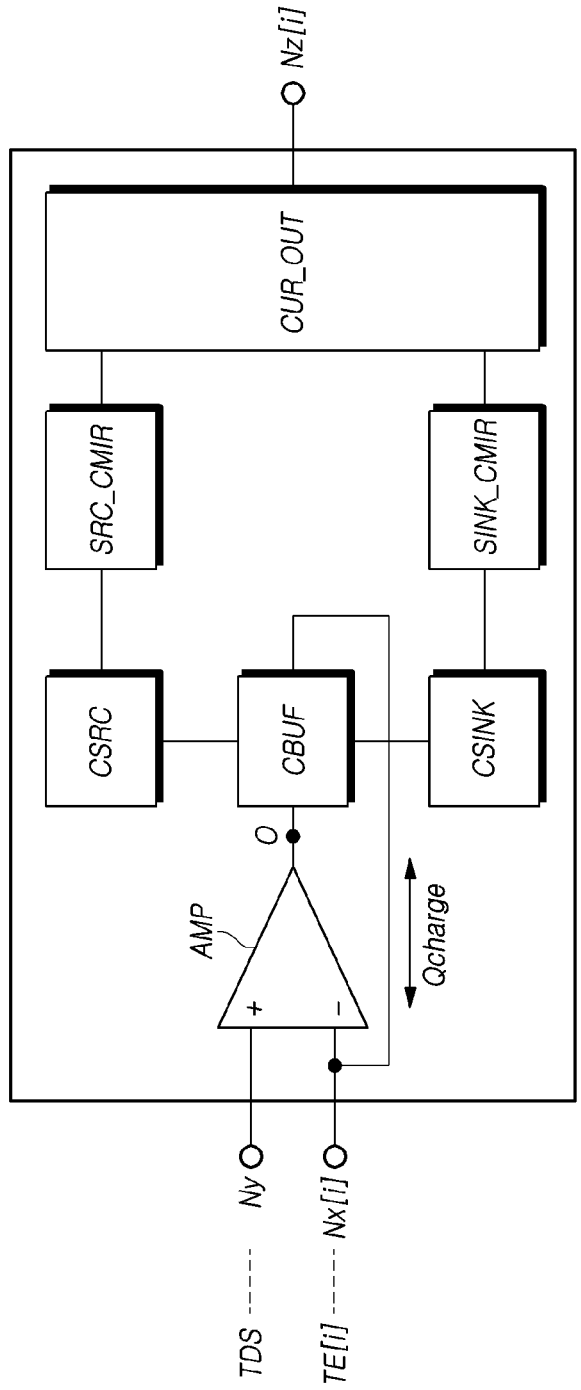
FIG. 12 is a block diagram of a current conveyor of a touch display device according to embodiments of the present disclosure.
Figure 13:
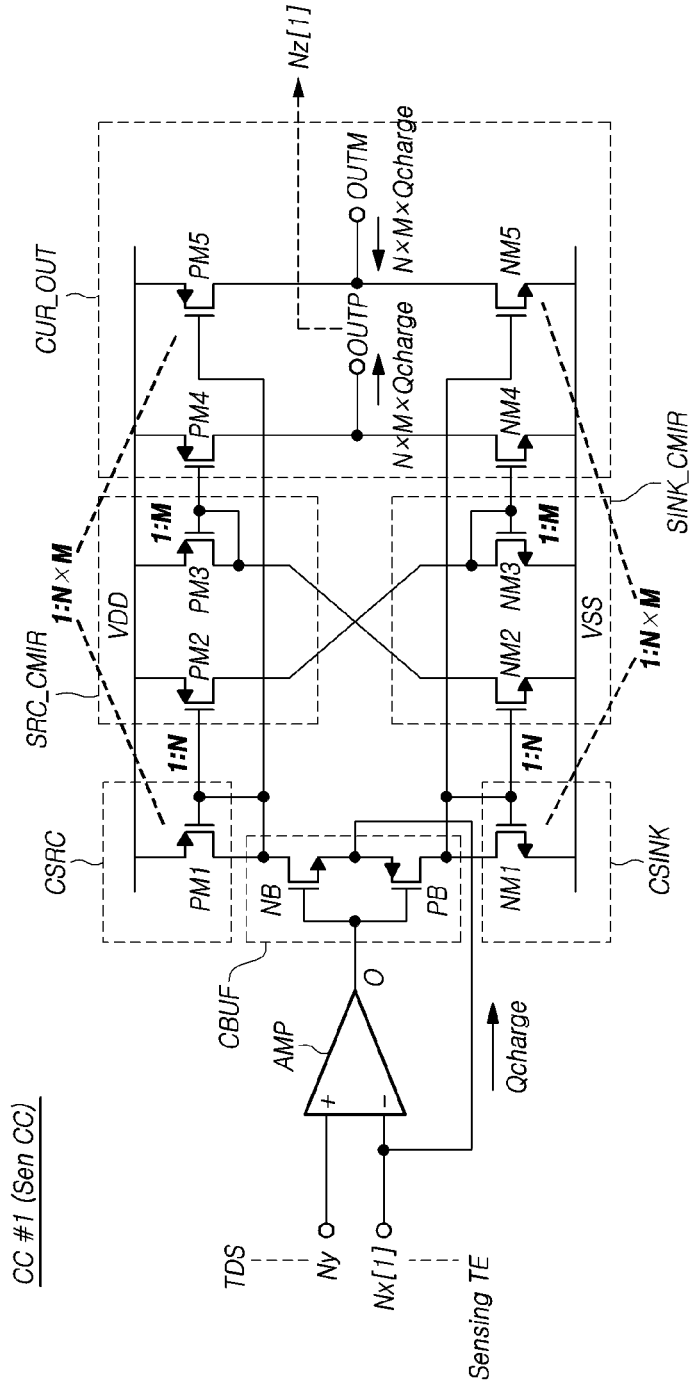
FIG. 13 is a detailed circuit of a current conveyor corresponding to a sensing touch electrode, when differential sensing is performed in a touch display device according to embodiments of the present disclosure.
Figure 14:
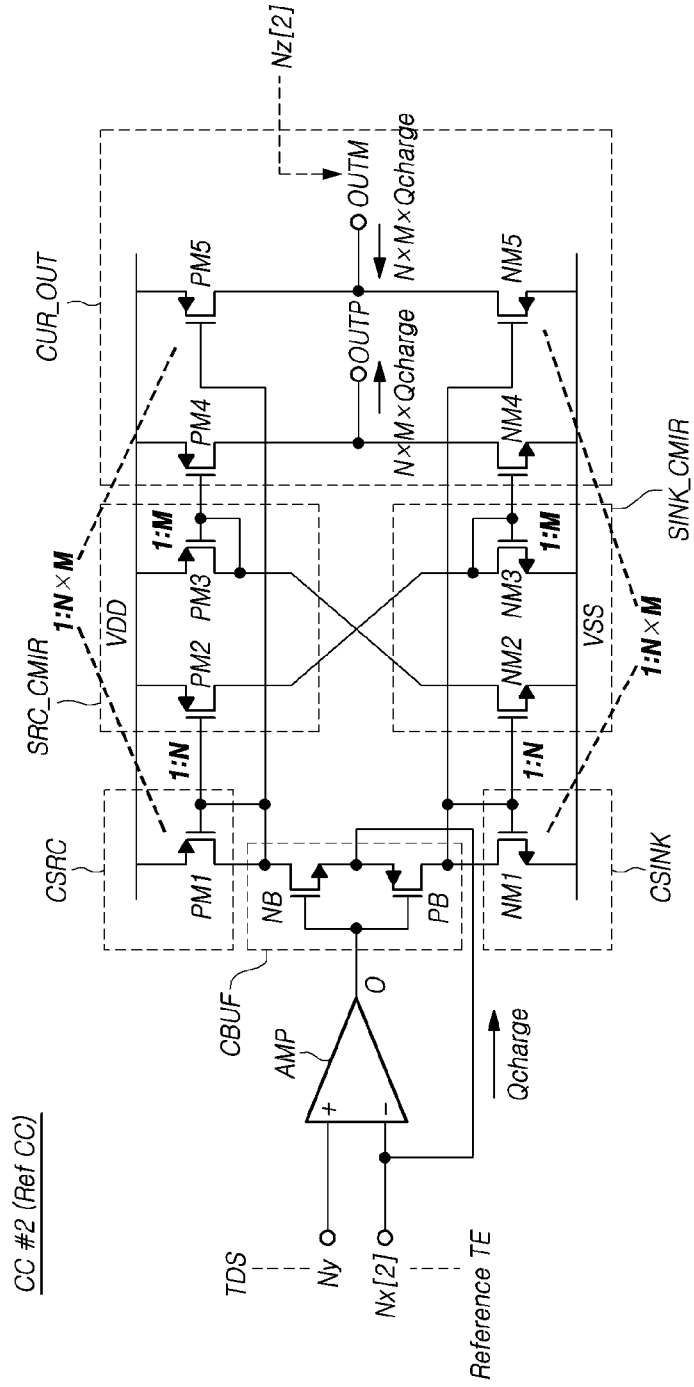
FIG. 14 is a detailed circuit of a current conveyor corresponding to a reference touch electrode, when differential sensing is performed in a touch display device according to embodiments of the present disclosure.

FIG. 11 is a diagram briefly illustrating a current conveyor CC of a touch display device according to embodiments of the present disclosure, and FIG. 12 is a block diagram of a current conveyor CC of a touch display device according to embodiments of the present disclosure. In addition, FIG. 13 is a detailed circuit of a current conveyor CC corresponding to a sensing touch electrode TE, when differential sensing is performed in a touch display device according to embodiments of the present disclosure, and FIG. 14 is a detailed circuit of a current conveyor CC corresponding to a reference touch electrode TE, when differential sensing is performed in a touch display device according to embodiments of the present disclosure.

Referring to FIGS. 11 and 12, the first current conveyor CC #1 and the second current conveyor CC #2 are a current conveyor CC having the same circuit configuration.

Referring to FIG. 11, the current conveyor CC may include a touch node terminal Nx[i] and a driving terminal Ny corresponding to two inputs, and an output node terminal Nz[i] corresponding to one output.

The touch node terminal Nx[i] is a terminal that is electrically connected to the i-th touch electrode TE[i], and receives a corresponding input charge from the i-th touch electrode TE[i]. Here, the i-th touch electrode TE[i] is a sensing touch electrode or a reference touch electrode.

The driving terminal Ny is a terminal for receiving the driving signal TDS.

The output node terminal Nz is a terminal through which an outflow signal flows out or an inflow signal flows in.

Referring to FIG. 11, in the current conveyor CC, the driving terminal Ny is a voltage input terminal to which the driving signal TDS is input. The current Iy flowing through the driving terminal Ny is zero.

Referring to FIG. 11, a current Iz corresponding to a current Ix flowing in the touch node terminal Nx[i] to which input charge is input flows through the output node terminal Nz[i].

Referring to FIG. 11, the current Iz flowing through the output node terminal Nz[i] may be a value (Iz=A*Ix) obtained by multiplying the current Ix flowing through the touch node terminal Nx[i] by the output gain A of the current conveyor CC.

Referring to FIG. 11, depending on whether the touch electrode connected to the current conveyor CC is a sensing touch electrode or a reference touch electrode, the current flowing through the output node terminal Nz[i] may be an outflow current flowing out to the outside, or may be an inflow current flowing in from the outside.

For example, when the current conveyor CC is the first current conveyor CC #1 connected to the first touch electrode TE[1] which is the sensing touch electrode, the current flowing in the output node terminal Nz[1] is an outflow current flowing out to the outside. This outflow current is a current corresponding to the first transfer charge (A×(Qn+Qt[1])).

For example, when the current conveyor CC is the second current conveyor CC #2 connected to the second touch electrode TE[2] which is the reference touch electrode, the current flowing in the output node terminal Nz[2] is an inflow current flowing in from the outside. This inflow current is a current corresponding to the second transfer charge (A×(Qn+Qt[2])).

The driving terminal Ny forms a virtual ground with the touch node terminal Nx[i]. Accordingly, the voltage Vy of the driving terminal Ny and the voltage Vx of the touch node terminal Nx[i] may become the same (Vx=Vy).

Referring to FIG. 12, the current conveyor CC may include a touch node terminal Nx[i] to which the i-th touch electrode TE[i], which may be a sensing touch electrode or a reference touch electrode, is electrically connected, a driving terminal Ny to which the driving signal TDS is applied, an amplifier AMP including an output terminal O for outputting a signal according to a signal input to the touch node terminal Nx[i] and the driving terminal Ny, a current buffering circuit CBUF that is controlled by a signal output from the output terminal O of the amplifier AMP and buffers the current, a current sourcing circuit CSRC for sourcing a current to the current buffering circuit CBUF, a sourcing current mirroring circuit SRC_CMIR for outputting a current corresponding to the sourcing current of the current sourcing circuit CSRC, a current sinking circuit CSINK for sinking a current from the current buffering circuit CBUF, and a sinking current mirroring circuit SINK_CMIR for outputting a current corresponding to the sinking current of the current sinking circuit CSINK.

Referring to FIG. 12, the current conveyor CC may further include a current output circuit CUR_OUT including an outflow terminal OUTP through which the outflow current flows out and an inflow terminal OUTM through which the inflow current flows in from the outside, according to the operation of the current sourcing circuit CSRC and the sourcing current mirroring circuit SRC_CMIR, and the operation of the current sinking circuit CSINK and the sinking current mirroring circuit SINK_CMIR.

Referring to FIGS. 13 and 14, the internal components of the first current conveyor CC #1 and the second current conveyor CC #2 are all same. However, the touch electrode electrically connected to the touch node terminal Nx[i] of the first current conveyor CC #1 and the touch electrode electrically connected to the touch node terminal Nx[i] of the second current conveyor CC #2 are different. The terminal OUTP connected to the external single-ended amplifier SAMP in the first current conveyor CC #1 and the terminal OUTM connected to the external single-ended amplifier SAMP in the second current conveyor CC #2 are different.

Referring to FIG. 13, the first current conveyor CC #1 may include a first amplifier AMP including a first touch node terminal Nx[1] to which a first touch electrode TE[1], which may be a sensing touch electrode, is electrically connected, a first driving terminal Ny to which the driving signal TDS is applied, and a first output terminal O for outputting a signal according to a signal input to the first touch node terminal Nx[1] and the first driving terminal Ny, a first current buffering circuit CBUF that is controlled by a signal output from the first output terminal O and buffers the current, a first current sourcing circuit CSRC for sourcing a current to the first current buffering circuit CBUF, a first sourcing current mirroring circuit SRC_CMIR for outputting a current corresponding to the sourcing current of the first current sourcing circuit CSRC, a first current sinking circuit CSINK for sinking a current from the first current buffering circuit CBUF, and a first sinking current mirroring circuit SINK_CMIR for outputting a current corresponding to the sinking current of the first current sinking circuit CSINK.

Referring to FIG. 13, the first current conveyor CC #1 may further include a first current output circuit CUR_OUT including a first outflow terminal OUTP through which a first outflow current flows out and a first inflow terminal OUTM through which a first inflow current flows in from the outside, according to the operation of the first current sourcing circuit CSRC and the first sourcing current mirroring circuit SRC_CMIR, and the operation of the first current sinking circuit CSINK and the first sinking current mirroring circuit SINK_CMIR.

The first outflow current and the first inflow current may have opposite directions and have the same magnitude.

Referring to FIG. 13, the first touch node terminal Nx[1] of the first amplifier AMP is electrically connected to the first current buffering circuit CBUF, so that the path of the charge (Qcharge) may be formed.

Referring to FIG. 13, the driving signal TDS applied to the first driving terminal Ny flows into the inside of the first amplifier AMP and flows out to the first output terminal O, and then, via the transistors (NB, PB) of the first current buffering circuit CBUF, may be transmitted to the first touch node terminal Nx[1] and applied to the first touch electrode TE[1] through the path of the charge (Qcharge).

Referring to FIG. 14, the second current conveyor CC #2 may include a second amplifier AMP including a second touch node terminal Nx[2] to which a second touch electrode TE[2], which may be a reference touch electrode, is electrically connected, a second driving terminal Ny to which the driving signal TDS is applied, and a second output terminal O for outputting a signal according to a signal input to the second touch node terminal Nx[2] and the second driving terminal Ny, a second current buffering circuit CBUF that is controlled by a signal output from the second output terminal O and buffers the current, a second current sourcing circuit CSRC for sourcing a current to the second current buffering circuit CBUF, a second sourcing current mirroring circuit SRC_CMIR for outputting a current corresponding to the sourcing current of the second current sourcing circuit CSRC, a second current sinking circuit CSINK for sinking a current from the second current buffering circuit CBUF, and a second sinking current mirroring circuit SINK_CMIR for outputting a current corresponding to the sinking current of the second current sinking circuit CSINK.

Referring to FIG. 14, the second current conveyor CC #2 may further include a second current output circuit CUR_OUT including a second outflow terminal OUTP through which a second outflow current flows out and a second inflow terminal OUTM through which a second inflow current flows in from the outside, according to the operation of the second current sourcing circuit CSRC and the second sourcing current mirroring circuit SRC_CMIR, and the operation of the second current sinking circuit CSINK and the second sinking current mirroring circuit SINK_CMIR.

The second outflow current and the second inflow current may have opposite directions and have the same magnitude.

Referring to FIG. 14, the second touch node terminal Nx[2] of the second amplifier AMP is electrically connected to the second current buffering circuit CBUF, so that the path of the charge (Qcharge) may be formed.

Referring to FIG. 14, the driving signal TDS applied to the second driving terminal Ny flows into the inside of the second amplifier AMP and flows out to the second output terminal O, and then, via the transistors (NB, PB) of the second current buffering circuit CBUF, may be transmitted to the second touch node terminal Nx[2] and applied to the second touch electrode TE[2], through the path of the charge (Qcharge).

Referring to FIG. 13, in the first current conveyor CC #1, the first transfer charge (A×(Qn+Qt[1])) corresponding to the first outflow current may flow out, through the first outflow terminal OUTP selected as the first output node terminal Nz[1] among the first outflow terminal OUTP and the first inflow terminal OUTM.

Referring to FIG. 14, in the second current conveyor CC #2, the second transfer charge (A×(Qn+Qt[2])) corresponding to the second inflow current may flow into the second inflow terminal OUTM selected as the second output node terminal Nz[2] among the second inflow terminal OUTM and the second outflow terminal OUTP.

The first transfer charge (A×(Qn+Qt[1])) and the second transfer charge (A×(Qn+Qt[2])) have opposite flow directions. The first transfer charge (A×(Qn+Qt[1])) flows in a direction from the first current conveyor CC #1 toward the single-ended amplifier SAMP, and the second transfer charge (A×(Qn+Qt[2])) flows in a direction of entering the second current conveyor CC #2.

Referring to FIGS. 13 and 14, the first and second current sourcing circuits CSRC and the first and second sourcing current mirroring circuits SRC_CMIR may include a P-type transistor (PM1, PM2, PM3).

Referring to FIGS. 13 and 14, the first and second current sinking circuits CSINK and the first and second sinking current mirroring circuits SINK_CMIR may include a N-type transistor (NM1, NM2, NM3).

Referring to FIGS. 13 and 14, the first and second current buffering circuits CBUF may include a N-type transistors NB connected to the first and second current sourcing circuits CSRC and a P-type transistor PB connected to the first and second current sinking circuits CSINK.

Referring to FIGS. 13 and 14, the first and second current output circuits CUR_OUT may include a P-type transistor (PM4, PM5) connected to the first and second sourcing current mirroring circuits SRC_CMIR and a N-type transistor (NM4, NM5) connected to the first and second sinking current mirroring circuits SINK_CMIR.

Referring to FIGS. 13 and 14, a channel characteristic value for the P-type transistor PM1 included in the first and second current sourcing circuits CSRC, and a channel characteristic value for the P-type transistor PM2 included in the first and second sourcing current mirroring circuits SRC_CMIR may be 1:N (N is a natural number of 1 or more). Here, the channel characteristic value may be a value obtained by dividing a channel width of a corresponding transistor by a channel length.

Referring to FIGS. 13 and 14, a channel characteristic value for the P-type transistor PM3 included in the first and second sourcing current mirroring circuits SRC_CMIR, and a channel characteristic value for the P-type transistor PM4 included in the first and second current output circuits CUR_OUT may be 1: M (M is a natural number of 1 or more). Here, the channel characteristic value may be a value obtained by dividing a channel width of a corresponding transistor by a channel length.

Referring to FIGS. 13 and 14, a channel characteristic value for the P-type transistor PM1 included in the first and second current sourcing circuits CSRC, and a channel characteristic value for the P-type transistor PM5 included in the first and second current output circuits CUR_OUT may be 1: (N×M). Here, the channel characteristic value may be a value obtained by dividing a channel width of a corresponding transistor by a channel length.

Referring to FIGS. 13 and 14, a channel characteristic value for the N-type transistor NM1 included in the first and second current sinking circuits CSINK and a channel characteristic value for the N-type transistor NM2 included in the first and second sinking current mirroring circuits SINK_CMIR may be 1: N (N is a natural number of 1 or more). Here, the channel characteristic value may be a value obtained by dividing a channel width of a corresponding transistor by a channel length.

Referring to FIGS. 13 and 14, a channel characteristic value for the N-type transistor NM3 included in the first and second sinking current mirroring circuit SINK_CMIR, and a channel characteristic value for the N-type transistor NM4 included in the first and second current output circuits CUR_OUT may be 1: M (M is a natural number of 1 or more). Here, the channel characteristic value may be a value obtained by dividing a channel width of a corresponding transistor by a channel length.

Referring to FIGS. 13 and 14, a channel characteristic value for the N-type transistor NM1 included in the first and second current sinking circuit CSINK, and a channel characteristic value for the N-type transistor NM5 included in the first and second current output circuits CUR_OUT may be 1:(N×M). Here, the channel characteristic value may be a value obtained by dividing a channel width of a corresponding transistor by a channel length.

Referring to FIGS. 13 and 14, the driving voltage VDD may be applied to the source node (or drain node) of the P-type transistors PM1 to PM5 included in the first and second current sourcing circuits CSRC, the first and second sourcing current mirroring circuits SRC_CMIR, and the first and second current output circuits CUR_OUT.

Referring to FIGS. 13 and 14, the drain node (or source node) of the P-type transistor PM1 included in the first and second current sourcing circuits CSRC may be electrically connected to the drain node of the N-type transistor NB of the current buffering circuit CBUF. In the P-type transistor PM1 included in the first and second current sourcing circuits CSRC, a gate node and a drain node may be electrically connected.

Referring to FIGS. 13 and 14, a base voltage VSS may be applied to the source node (or drain node) of the N-type transistors NM1 to NM5 included in the first and second current sinking circuits CSINK, the first and second sinking current mirroring circuits SINK_CMIR, and the first and second current output circuits CUR_OUT.

Referring to FIGS. 13 and 14, the drain node (or source node) of the N-type transistor NM1 included in the first and second current sinking circuits CSINK may be electrically connected to the drain node of the P-type transistor PB of the current buffering circuit CBUF. The gate node and the drain node may be electrically connected in the N-type transistor NM1 included in the first and second current sinking circuit CSINK.

In the current buffering circuit CBUF, the source node (or drain node) of the N-type transistor NB and the source node (or drain node) of the P-type transistor PB are electrically connected. In the current buffering circuit CBUF, a point where the source node (or drain node) of the N-type transistor NB and the source node (or drain node) of the P-type transistor PB are electrically connected may be electrically connected to the first and second touch node terminals Nx[1] and Nx[2] of the first and second amplifiers (AMP).

Referring to FIGS. 13 and 14, in the first and second current output circuits CUR_OUT, the drain node (or source node) of one P-type transistor PM4 and the drain node (or source node) of one N-type transistor NM4 are electrically connected in the first and second outflow terminals OUTP.

Referring to FIGS. 13 and 14, in the first and second current output circuits CUR_OUT, the drain node (or source node) of the other P-type transistor PM5 and the drain node (or source node) of the other N-type transistor NM5 may be electrically connected in the first and second inflow terminals OUTM.

Referring to FIGS. 13 and 14, the outflow charge (N×M× Qcharge) having a charge amount of N×M times the charge (Qcharge) may flow out from the first and second outflow terminals OUTP, based on the charge (Qcharge) flowing from the first touch node terminal Nx[1] of the first amplifier AMP to the first current buffering circuit CBUF.

Referring to FIGS. 13 and 14, inflow charges (N×M× Qcharge) having a charge amount of N×M times the charge (Qcharge) may be introduced in the first and second inflow terminals OUTM, based on the charge (Qcharge) flowing from the first touch node terminal Nx[1] of the first amplifier AMP to the first current buffering circuit CBUF. Here, the inflow charge (N×M×Qcharge) may have the same charge amount as the outflow charge (N×M×Qcharge), and have the opposite flow direction.

Figure 15:
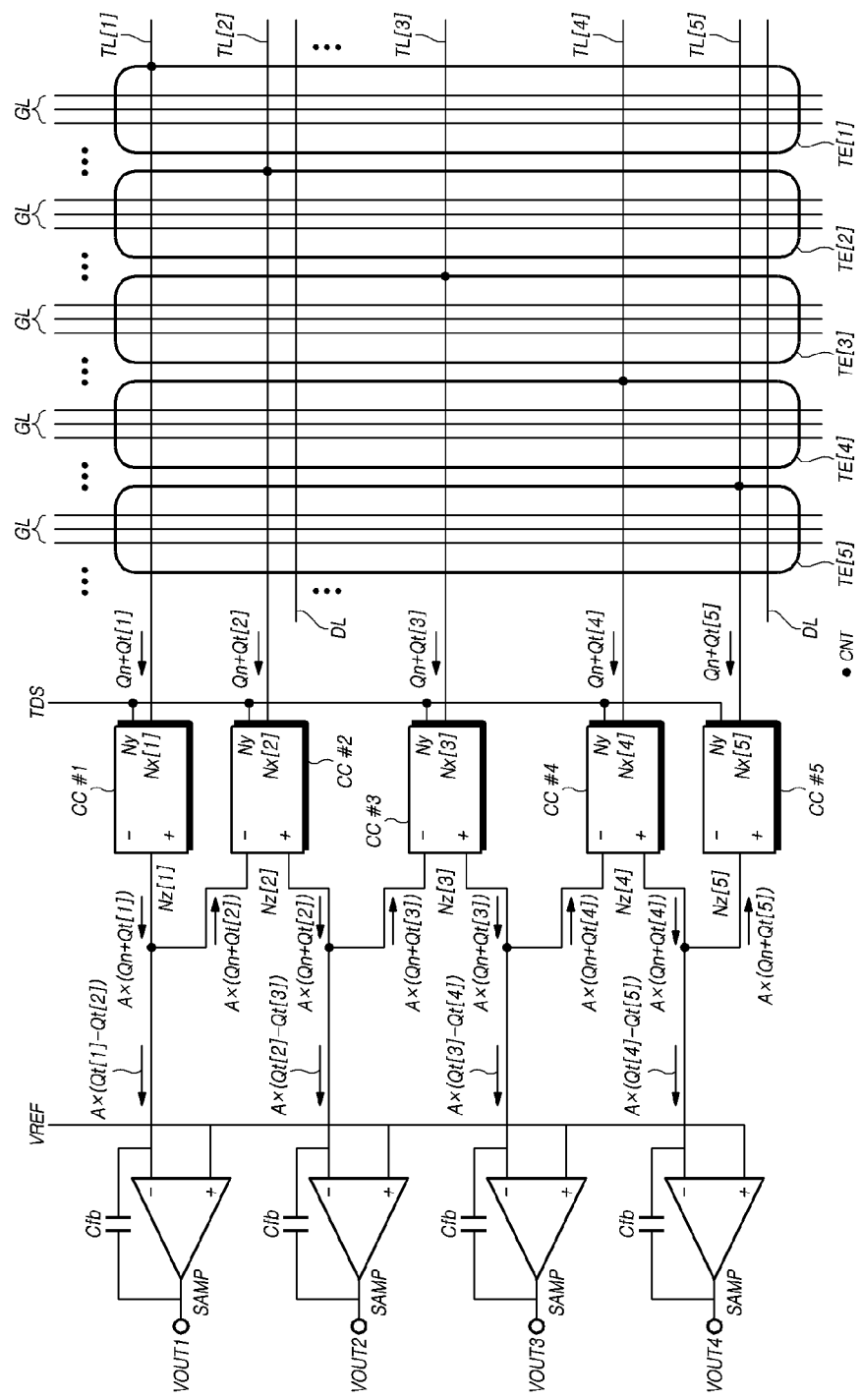
FIG. 15 is a diagram illustrating the differential sensing circuit of FIG. 10 for five touch electrodes in a touch display device according to embodiments of the present disclosure.

FIG. 15 is a diagram illustrating the differential sensing circuit of FIG. 10 for five touch electrodes TE in a touch display device according to embodiments of the present disclosure.

FIG. 15 is a diagram showing the situation where a touch display device according to embodiments of the present disclosure 1) differentially senses the first touch electrode TE[1] as the sensing touch electrode and the second touch electrode TE[2] as the reference touch electrode, 2) differentially senses the second touch electrode TE[2] as the sensing touch electrode and the third touch electrode TE[3] as the reference touch electrode, 3) differentially senses the third touch electrode TE[3] as the sensing touch electrode and the fourth touch electrode TE[4] as the reference touch electrode, and 4) differentially senses the fourth touch electrode TE[4] as the sensing touch electrode and the fifth touch electrode TE[5] as the reference touch electrode.

Referring to FIG. 15, the first touch electrode TE[1] may be electrically connected to the first current conveyor CC #1 through the first touch line TL[1], the second touch electrode TE[2] may be electrically connected to the second current conveyor CC #2 through the second touch line TL[2], the third touch electrode TE[3] may be electrically connected to the third current conveyor CC #3 through the third touch line TL[3], the fourth touch electrode TE[4] may be electrically connected to the fourth current conveyor CC #4 through the fourth touch line TL[4], and the fifth touch electrode TE[5] may be electrically connected to the fifth current conveyor CC #5 through the fifth touch line TL[5].

Referring to FIG. 15, when differentially sensing the first touch electrode TE[1] as the sensing touch electrode and the second touch electrode TE[2] as the reference touch electrode, the first current conveyor CC #1 may output the first outflow charge (A×(Qn+Qt[1])) corresponding to the first input charge (Qn+Qt[1]) input to the first touch electrode TE[1] to the outflow terminal (OUTP, +) selected as the output node terminal Nz[1]. The second current conveyor CC #2 may flow the second inflow charge (A×(Qn+Qt[2])) corresponding to the second input charge (Qn+Qt[2]) input to the second touch electrode TE[2] into the inflow terminal (OUTM, −) selected as the output node terminal Nz[2]. Accordingly, the single-ended amplifier SAMP may receive a differential signal (A×(Qt[1]−Qt[2])) which is obtained by differentiating the first outflow charge (A×(Qn+Qt[1])) and the second inflow charge (A×(Qn+Qt[2])) to remove a common noise charge Qn, and output a differential output signal VOUT1.

Referring to FIG. 15, when differentially sensing the second touch electrode TE[2] as the sensing touch electrode and the third touch electrode TE[3] as the reference touch electrode, the second current conveyor CC #2 may output the second outflow charge (A×(Qn+Qt[2])) corresponding to the second input charge (Qn+Qt[2]) input to the second touch electrode TE[2] to the outflow terminal (OUTP, +) selected as the output node terminal Nz[2]. The third current conveyor CC #3 may flow the third inflow charge (A×(Qn+Qt[3])) corresponding to the third input charge (Qn+Qt[3]) input to the third touch electrode TE[3] into the inflow terminal (OUTM, −) selected as the output node terminal Nz[3]. Accordingly, the single-ended amplifier SAMP may receive a differential signal (A×(Qt[2]−Qt[3])) which is obtained by differentiating the second outflow charge (A×(Qn+Qt[2])) and the third inflow charge (A×(Qn+Qt[3])) to remove a common noise charge Qn, and output a differential output signal VOUT2.

Referring to FIG. 15, when differentially sensing the third touch electrode TE[3] as the sensing touch electrode and the fourth touch electrode TE[4] as the reference touch electrode, the third current conveyor CC #3 may output the third outflow charge (A×(Qn+Qt[3])) corresponding to the third input charge (Qn+Qt[3]) input to the third touch electrode TE[3] to the outflow terminal (OUTP, +) selected as the output node terminal Nz[3]. The fourth current conveyor CC #4 may flow the fourth inflow charge (A×(Qn+Qt[4])) corresponding to the fourth input charge (Qn+Qt[4]) input to the fourth touch electrode TE[4] into the inflow terminal (OUTM, −) selected as the output node terminal Nz[4]. Accordingly, the single-ended amplifier SAMP may receive a differential signal (A×(Qt[3]−Qt[4])) which is obtained by differentiating the third outflow charge (A×(Qn+Qt[3])) and the fourth inflow charge (A×(Qn+Qt[4])) to remove a common noise charge Qn, and output a differential output signal VOUT3.

Referring to FIG. 15, when differentially sensing the fourth touch electrode TE[4] as the sensing touch electrode and the fifth touch electrode TE[5] as the reference touch electrode, the fourth current conveyor CC #4 may output the fourth outflow charge (A×(Qn+Qt[4])) corresponding to the fourth input charge (Qn+Qt[4]) input to the fourth touch electrode TE[4] to the outflow terminal (OUTP, +) selected as the output node terminal Nz[4]. The fifth current conveyor CC #5 may flow the fifth inflow charge (A×(Qn+Qt[5])) corresponding to the fifth input charge Qn+Qt[5] input to the fifth touch electrode TE[5] into the inflow terminal (OUTM, −) selected as the output node terminal Nz[5]. Accordingly, the single-ended amplifier SAMP may receive a differential signal (A×(Qt[4]−Qt[5])) which is obtained by differentiating the fourth outflow charge (A×(Qn+Qt[4])) and the fifth inflow charge (A×(Qn+Qt[5])) to remove a common noise charge Qn, and output a differential output signal VOUT4.

Figure 16:
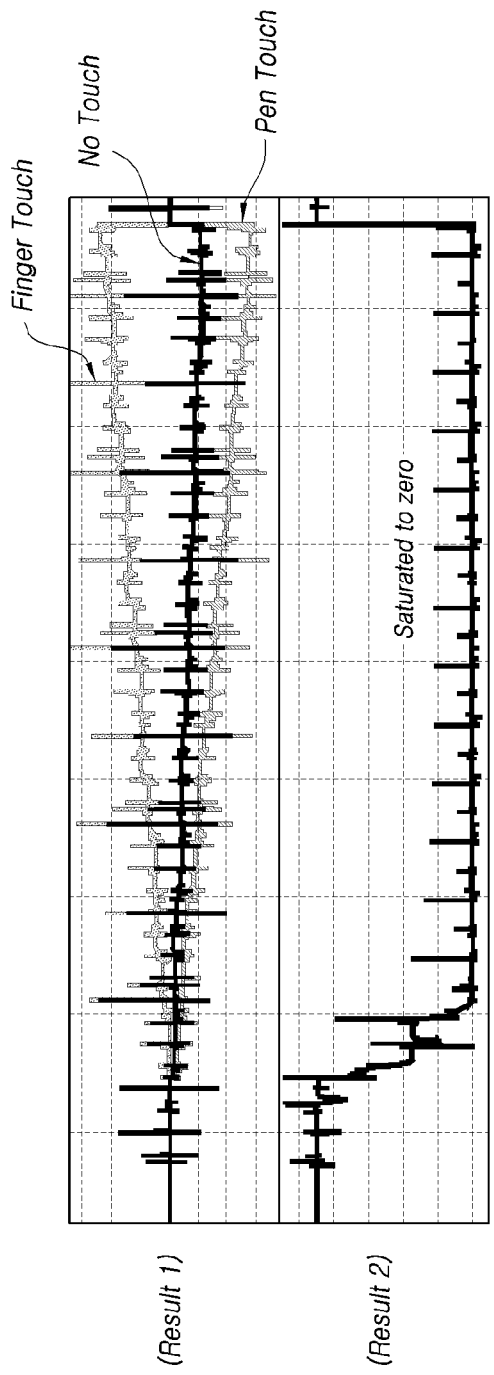
FIG. 16 is a graph comparing a sensing result obtained by performing differential sensing using a single-ended amplifier with a sensing result obtained by performing single sensing using a single-ended amplifier, in a touch display device according to embodiments of the present disclosure.

FIG. 16 is a graph comparing a sensing result Result 1 obtained by performing differential sensing using a single-ended amplifier SAMP with a sensing result Result 2 obtained by performing single sensing using a single-ended amplifier SAMP, in a touch display device according to embodiments of the present disclosure.

Referring to FIG. 16, when simultaneously sensing a touch while driving a display, if two touch electrodes TE are differentially sensed using a single-ended amplifier SAMP according to embodiments of the present disclosure, when a finger touch is performed, a sensing value that is significantly different from a sensing value in the case of no touch can be obtained. Therefore, it is possible to accurately sense a finger touch while driving the display for updating an image frame screen.

Referring to FIG. 16, when simultaneously sensing a touch during display driving, if a differential sensing is performed using a single-ended amplifier (SAMP) according to embodiments of the present disclosure, when a pen touch is performed, it is possible to obtain a sensing value that is significantly different from the sensing value in the case of no touch. Therefore, it is possible to accurately sense a finger touch while driving the display for updating an image frame screen.

Referring to FIG. 16, a sensing value for a finger touch may have a value greater than a sensing value in the case of no touch, and a sensing value for a pen touch may have a value less than a sensing value in the case of no touch. Accordingly, the sensing value for the finger touch and the sensing value for the pen touch can be distinguished from each other. That is, when it is recognized that a touch has occurred, the touch display device can distinguish whether the recognized touch is a finger touch or a pen touch.

Referring to FIG. 16, when simultaneously sensing a touch while driving a display, if a single sensing is performed for only one touch electrode TE by using a single-ended amplifier SAMP, the sensing value is saturated to zero or a value close to zero. Accordingly, when a touch is sensed while driving a display for updating an image frame screen, due to the influence of noise charge by the display driving, it is impossible to sense a finger touch, a pen touch, or the like at all.

Figure 17:
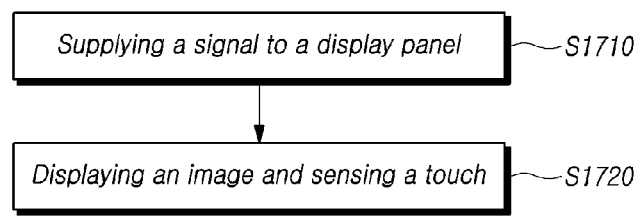
FIG. 17 is a flowchart of a touch sensing method of a touch display device according to embodiments of the present disclosure.

FIG. 17 is a flowchart of a touch sensing method of a touch display device according to embodiments of the present disclosure.

Referring to FIG. 17, a touch sensing method of a touch display device according to embodiments of the present disclosure may include a step S1710 of outputting a data signal and a gate signal to the data line and the gate line disposed in the display panel DISP, and applying a driving signal TDS to the first touch electrode TE[1] and the second touch electrode TE[2] among the plurality of touch electrodes TE disposed in the display panel DISP, and a step S1720 of sensing a touch by differentially sensing the first touch electrode TE[1] and the second touch electrode TE[2], while displaying an image in response to the data signal VDATA and the driving signal TDS.

In step S1720, the flow of the first input charge (Qn+Qt[1]) input from the first touch electrode TE[1] and the flow of the second input charge (Qn+Qt[2]) input from the second touch electrode TE[2] may be controlled to be in the opposite direction, and a differential sensing value may be generated by removing the noise charge Qn based on the first input charge (Qn+Qt[1]) and the second input charge (Qn+Qt[2]) whose flow direction is controlled.

The touch display device according to the embodiments of the present disclosure described above may be a liquid crystal display (LCD), an organic light emitting diode (OLED) display, a quantum dot display, or the like, but is not limited thereto, and may be any various types of displays, if the touch sensing method described above can be applied.

For example, when the touch display device according to the embodiments of the present disclosure is a liquid crystal display device, the touch electrodes TE are disposed in the display panel DISP and may be a common electrode to which a common voltage for driving a display is applied.

As another example, when the touch display device according to the embodiments of the present disclosure is an OLED display, it may have a top emission structure in which light is emitted to the top of the display panel DISP or may have a bottom emission structure in which light is emitted to the bottom of the display panel DISP.

When the touch display device according to the embodiments of the present disclosure is an OLED display, the touch electrodes TE are included in the display panel DISP and may be disposed in the top of an encapsulation layer positioned on transistors and organic light emitting diodes (OLEDs). Such a position of the touch electrodes TE may be more suitable for a top emission structure.

When the touch display device according to the embodiments of the present disclosure is an OLED display, the touch electrodes TE may be anode electrodes of the organic light emitting diodes (OLEDs) included in the display panel DISP, or may be electrodes positioned in various layers positioned below the anode electrodes. Such a position of the touch electrodes TE may be more suitable for a bottom emission structure.

The touch electrodes TE included in the touch display device according to the embodiments of the present disclosure may be a mesh type having openings for improving light emission efficiency, and may be a transparent electrode or may further include a transparent electrode.

The touch electrodes TE included in the touch display device according to embodiments of the present disclosure may be dedicated electrodes for touch sensing, or may be electrodes that can be used for both display driving and touch sensing.

According to the above-described embodiments of the present disclosure, the display driving and the touch driving are simultaneously performed, and a normal image and a normal touch sensing may be provided.

In addition, according to embodiments of the present disclosure, when the display driving and the touch driving are simultaneously performed, the touch can be accurately sensed without the influence of the display driving through differential sensing.

In addition, according to embodiments of the present disclosure, when the display driving and the touch driving are simultaneously performed, differential sensing may be performed to accurately sense a touch without the influence of display driving. Furthermore, by enabling differential sensing by using a single-ended amplifier without using a differential amplifier, the number of circuit components and the circuit area for differential sensing can be significantly reduced.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A touch display device comprising:
a display panel in which a plurality of data lines and a plurality of gate lines are disposed, and in which a plurality of touch electrodes are disposed;
a data driving circuit configured to drive the plurality of data lines;
a gate driving circuit configured to drive the plurality of gate lines; and
a touch driving circuit configured to differentially sense a first touch electrode and a second touch electrode among the plurality of touch electrodes,
wherein the touch driving circuit comprises:
a first current conveyor including a first touch node terminal which receives a first input charge from the first touch electrode, a first driving terminal to which a touch driving signal is input, and a first outflow terminal through which a first transfer charge corresponding to the first input charge flows out;
a second current conveyor including a second touch node terminal which receives a second input charge from the second touch electrode, a second driving terminal to which the touch driving signal is input, and a second inflow terminal through which a second transfer charge corresponding to the second input charge flows in; and
a single-ended amplifier including a sensing input terminal to which the first outflow terminal and the second inflow terminal are electrically connected in common, and to which a differential charge between the first transfer charge and the second transfer charge is input, a reference input terminal to which a reference voltage is applied, and an amplification output terminal that outputs a differential output signal corresponding to the differential charge, and
wherein the first current conveyor of the touch driving circuit comprises:
a first amplifier including the first touch node terminal, the first driving terminal, and a first output terminal for outputting a signal according to a signal input to the first touch node terminal and the first driving terminal;
a first current buffering circuit configured to be controlled by the signal output from the first output terminal and buffer a current;
a first current sourcing circuit configured to source a current to the first current buffering circuit;
a first sourcing current mirroring circuit configured to output a current corresponding to the sourcing current of the first current sourcing circuit;
a first current sinking circuit configured to sink a current from the first current buffering circuit; and
a first sinking current mirroring circuit configured to output a current corresponding to the sinking current of the first current sinking circuit, and
the second current conveyor of the touch driving circuit comprises:
a second amplifier including the second touch node terminal, the second driving terminal, and a second output terminal for outputting a signal according to a signal input to the second touch node terminal and the second driving terminal;

a second current buffering circuit configured to be controlled by the signal output from the second output terminal and buffer a current;

a second current sourcing circuit configured to source a current to the second current buffering circuit;

a second sourcing current mirroring circuit configured to output a current corresponding to the sourcing current of the second current sourcing circuit;

a second current sinking circuit configured to sink a current from the second current buffering circuit; and a second sinking current mirroring circuit configured to output a current corresponding to the sinking current of the second current sinking circuit.

2. The touch display device of claim 1, wherein the first transfer charge is determined according to the first input charge and a first output gain of the first current conveyor, and the second transfer charge is determined according to the second input charge and a second output gain of the second current conveyor.

3. The touch display device of claim 1, wherein in the first transfer charge flowing out through the first outflow terminal selected as a first output node terminal of the first current conveyor, a charge is reduced as much as the second transfer charge flowing into the second inflow terminal selected as a second output node terminal of the second current conveyor, and the differential charge is a charge that is reduced as much as the second transfer charge from the first transfer charge, and is a charge that canceled out a noise charge that is commonly included in the first transfer charge and the second transfer charge.

4. The touch display device of claim 1, wherein the first current conveyor of the touch driving circuit further comprises:

a first current output circuit including the first outflow terminal through which a first outflow current flows out to outside and a first inflow terminal through which a first inflow current flows in from the outside, according to operations of the first current sourcing circuit and the first sourcing current mirroring circuit, and the first current sinking circuit and the first sinking current mirroring circuit, wherein the first outflow current and the first inflow current have opposite direction and have a same magnitude, and the second current conveyor of the touch driving circuit further comprises:

a second current output circuit including a second outflow terminal through which a second outflow current flows out to the outside and the second inflow terminal through which a second inflow current flows in from the outside, according to operations of the second current sourcing circuit and the second sourcing current mirroring circuit, and the second current sinking circuit and the second sinking current mirroring circuit, wherein the second outflow current and the second inflow current have opposite direction and have a same magnitude.

5. The touch display device of claim 4, wherein in the first current conveyor of the touch driving circuit, the first transfer charge corresponding to the first outflow current flows out through the first outflow terminal selected as a first output node terminal among the first outflow terminal and the first inflow terminal, and in the second current conveyor of the touch driving circuit, the second transfer charge corresponding to the second inflow current flows into the second inflow terminal selected as a second output node terminal among the second inflow terminal and the second outflow terminal.

6. The touch display device of claim 5, wherein the first and second current sourcing circuits and the first and second sourcing current mirroring circuits include a P-type transistor, the first and second current sinking circuits and the first and second sinking current mirroring circuits include an N-type transistor, the first and second current buffering circuits include a N-type transistor connected to the first and second current sourcing circuits and a P-type transistor connected to the first and second current sinking circuits, and the first and second current output circuits include a P-type transistor connected to the first and second sourcing current mirroring circuits and a N-type transistor connected to the first and second sinking current mirroring circuits.

7. The touch display device of claim 6, wherein a channel characteristic value for the P-type transistor included in the first and second current sourcing circuits, and a channel characteristic value for the P-type transistor included in the first and second sourcing current mirroring circuits are 1:N, wherein N is a natural number of 1 or more, and the channel characteristic value is a value obtained by dividing a channel width by a channel length, a channel characteristic value for the P-type transistor included in the first and second sourcing current mirroring circuits, and a channel characteristic value for the P-type transistor included in the first and second current output circuits are 1: M, wherein M is a natural number of 1 or more, a channel characteristic value for the P-type transistor included in the first and second current sourcing circuits, and a channel characteristic value for the P-type transistor included in the first and second current output circuits are 1: (N×M), a channel characteristic value for the N-type transistor included in the first and second current sinking circuits, and a channel characteristic value for the N-type transistor included in the first and second sinking current mirroring circuits are 1: N, a channel characteristic value for the N-type transistor included in the first and second sinking current mirroring circuit, and a channel characteristic value for the N-type transistor included in the first and second current output circuits are 1: M, and a channel characteristic value for the N-type transistor included in the first and second current sinking circuit, and a channel characteristic value for the N-type transistor included in the first and second current output circuits are 1:(N×M).

8. The touch display device of claim 1, wherein the touch driving circuit supplies the touch driving signal having a selected signal waveform among a signal waveform whose voltage level fluctuates depending on a type of a touch object to be sensed and a signal waveform whose voltage level is constant.

9. The touch display device of claim 1, wherein the reference voltage has a signal waveform whose voltage level fluctuates or a signal waveform whose voltage level is constant.

10. The touch display device of claim 1, wherein the plurality of touch electrodes are disposed in a matrix form, an area occupied by each of the plurality of touch electrodes overlaps an area occupied by two or more sub-pixels, the first touch electrode and the second touch electrode are disposed in a same column or row, two or more data lines overlapping the first touch electrode and two or more data lines overlapping the second touch electrode are a same, and two or more gate lines overlapping the first touch electrode and two or more gate lines overlapping the second touch electrode are different from each other.

11. The touch display device of claim 1, wherein a plurality of touch lines electrically connecting the plurality of touch electrodes and the touch driving circuit are disposed in the display panel, and the plurality of touch lines are disposed parallel to the plurality of data lines.

12. The touch display device of claim 1, wherein the touch driving circuit applies the touch driving signal to the first touch electrode and the second touch electrode while display driving is performed by supplying a data signal for displaying an image to the plurality of data lines.

13. The touch display device of claim 12, wherein when the touch driving signal has a signal waveform whose voltage level fluctuates, a width of a high-level voltage period of the touch driving signal is longer than one horizontal time for display driving.

14. The touch display device of claim 12, wherein when the touch driving signal has a signal waveform whose voltage level fluctuates, a width of a high-level voltage period of the touch driving signal is shorter than one horizontal time for display driving.

15. The touch display device of claim 12, wherein the data driving circuit converts digital image data into an image analog signal based on a gamma reference voltage and outputs the data signal,
wherein the gamma reference voltage corresponds to the touch driving signal input to the first and second current conveyors with respect to at least one of a frequency, a phase, and an amplitude.

16. The touch display device of claim 12, wherein a ground voltage applied to the display panel is a signal whose voltage level is changed, and corresponds to the touch driving signal with respect to at least one of a frequency, an amplitude, and a phase.

17. A touch driving circuit comprising:
a first current conveyor including a first touch node terminal which receives a first input charge from a first touch electrode among a plurality of touch electrodes disposed in a display panel, a first driving terminal to which a touch driving signal is input, and a first outflow terminal through which a first transfer charge corresponding to the first input charge flows out;
a second current conveyor including a second touch node terminal which receives a second input charge from a second touch electrode among the plurality of touch electrodes, a second driving terminal to which the touch driving signal is input, and a second inflow terminal through which a second transfer charge corresponding to the second input charge flows in; and
a single-ended amplifier including a sensing input terminal to which the first outflow terminal and the second inflow terminal are electrically connected in common, and to which a differential charge between the first transfer charge and the second transfer charge is input, a reference input terminal to which a reference voltage is applied, and an amplification output terminal that outputs a differential output signal corresponding to the differential charge,
wherein the first current conveyor further comprises:
a first amplifier including the first touch node terminal, the first driving terminal, and a first output terminal for outputting a signal according to a signal input to the first touch node terminal and the first driving terminal;
a first current buffering circuit configured to be controlled by the signal output from the first output terminal and buffer a current;
a first current sourcing circuit configured to source a current to the first current buffering circuit;
a first sourcing current mirroring circuit configured to output a current corresponding to the sourcing current of the first current sourcing circuit;
a first current sinking circuit configured to sink a current from the first current buffering circuit; and
a first sinking current mirroring circuit configured to output a current corresponding to the sinking current of the first current sinking circuit, and
the second current conveyor further comprises:
a second amplifier including the second touch node terminal, the second driving terminal, and a second output terminal for outputting a signal according to a signal input to the second touch node terminal and the second driving terminal;
a second current buffering circuit configured to be controlled by the signal output from the second output terminal and buffer a current;
a second current sourcing circuit configured to source a current to the second current buffering circuit;
a second sourcing current mirroring circuit configured to output a current corresponding to the sourcing current of the second current sourcing circuit;
a second current sinking circuit configured to sink a current from the second current buffering circuit; and
a second sinking current mirroring circuit configured to output a current corresponding to the sinking current of the second current sinking circuit.

18. The touch driving circuit of claim 17, wherein the differential charge is a charge from which a noise charge that is commonly included in the first transfer charge and the second transfer charge is removed.

19. A method of sensing a touch using the touch driving circuit of claim 17, the method comprising:
outputting a data signal and a gate signal to a data line and a gate line respectively disposed in a display panel, and applying a driving signal to a first touch electrode and a second touch electrode among a plurality of touch electrodes disposed in the display panel; and
sensing a touch by differentially sensing the first touch electrode and the second touch electrode, while displaying an image in response to the data signal and the driving signal,
wherein sensing a touch comprises controlling a flow of a first input charge input from the first touch electrode and a flow of a second input charge input from the second touch electrode to be in opposite directions, and generating a differential sensing value by removing a noise charge based on the first input charge and the second input charge whose flow direction is controlled.

* * * * *